US012348069B2

(12) United States Patent
Sporck et al.

(10) Patent No.: US 12,348,069 B2
(45) Date of Patent: *Jul. 1, 2025

(54) BATTERY DISCHARGE CURRENT MANAGEMENT SYSTEM WITH FAST DISCHARGING FUNCTION AND RELATED INTEGRATED CIRCUIT

(71) Applicant: Monolithic Power Systems, Inc., San Jose, CA (US)

(72) Inventors: Christian Sporck, Campbell, CA (US); Rui Wang, Chengdu (CN); Min Xu, Hangzhou (CN)

(73) Assignee: Monolithic Power Systems, Inc., San Jose, CA (US)

( * ) Notice: Subject to any disclaimer, the term of this patent is extended or adjusted under 35 U.S.C. 154(b) by 881 days.

This patent is subject to a terminal disclaimer.

(21) Appl. No.: 17/484,147

(22) Filed: Sep. 24, 2021

(65) Prior Publication Data
US 2022/0102996 A1 Mar. 31, 2022

(30) Foreign Application Priority Data

Sep. 28, 2020 (CN) .......................... 202011045335.7

(51) Int. Cl.
*H02J 7/00* (2006.01)
(52) U.S. Cl.
CPC .......... *H02J 7/0063* (2013.01); *H02J 7/0068* (2013.01); *H02J 7/00716* (2020.01)

(58) Field of Classification Search
CPC ..................................................... H02J 7/0063
USPC ............................................................ 320/135
See application file for complete search history.

(56) References Cited

U.S. PATENT DOCUMENTS

| 7,734,317 B2 * | 6/2010 | Patel .......................... H02J 7/34 455/574 |
| 11,108,256 B2 | 8/2021 | Sporck et al. |
| 2009/0115252 A1 * | 5/2009 | Caraghiorghiopol ..... H02J 1/10 307/48 |
| 2015/0303724 A1 * | 10/2015 | Lin ........................... H02J 7/00 439/660 |

FOREIGN PATENT DOCUMENTS

WO   WO2016/036430    *  3/2016

OTHER PUBLICATIONS

U.S. Appl. No. 17/233,291, filed Apr. 16, 2021, Monolithic Power Systems.

* cited by examiner

*Primary Examiner* — Yalkew Fantu
(74) *Attorney, Agent, or Firm* — Perkins Coie LLP

(57) ABSTRACT

A battery discharge current management system used for discharging battery packs. The battery discharge current management system has a voltage converting circuit and at least one switch module. The voltage converting circuit can operate at a charge mode or a discharge mode. The voltage converting circuit can serve to discharge battery packs so as to provide a master discharge current signal to other devices when it operates at the discharge mode. The voltage converting circuit further controls the at least one switch module to discharge the battery packs so as to provide at least one additional discharge current signal.

29 Claims, 24 Drawing Sheets

BATTERY DISCHARGE CURRENT MANAGEMENT SYSTEM WITH FAST DISCHARGING FUNCTION AND RELATED INTEGRATED CIRCUIT

CROSS-REFERENCE TO RELATED APPLICATION

This application claims the benefit of CN application No. 202011045335.7, filed on Sep. 28, 2020, and incorporated herein by reference.

TECHNICAL FIELD

The present invention relates to electrical circuit, more particularly but not exclusively relates to battery current management systems.

BACKGROUND

With the rapid development of portable electronic devices, such as tablets, phablets, laptops, thin computing devices, power bank, etc., battery charge and discharge circuit is widely used in various portable electronic devices. As the entertainment function of the portable electronic devices expands, battery capacity becomes larger and larger to ensure enough navigation time. In consequence, portable electronic device manufacturers desire to seek solutions to charge their batteries much faster than before. Meanwhile, in some applications, some portable devices are required to supply power to other portable devices with a large discharge current capacity. Furthermore, good thermal dissipation also needs to be considered.

Therefore, it is desired to have solutions for a battery current management system with good thermal dissipation for realizing fast charge and fast discharge to the portable electronic devices by a larger current.

SUMMARY

In accomplishing the above and other objects, there has been provided a battery discharge current management system comprising a voltage converting circuit and a first switch module in accordance with an embodiment of the present invention. The voltage converting circuit has a first pin, a second pin and a third pin. The first switch module has a first terminal coupled to the first pin, a second terminal coupled to the second pin, and a control terminal coupled to the third pin. When the battery discharge current management system is configured to operate in a discharge state, the voltage converting circuit is configured to convert a system voltage signal at the second pin to an output voltage signal at the first pin. Meanwhile, the voltage converting circuit is further configured to generate a master discharge current signal at the first pin, and further configured to control the first switch module to generate a first additional discharge current signal at the first terminal of the first switch module.

In accordance with an embodiment of the present invention, a battery discharge current management system comprises a voltage converting circuit and a first switch module. The voltage converting circuit has a first pin coupled to a USB port and a second pin coupled to a battery pack. The switch module has a first terminal coupled to the first pin, a second terminal coupled to the second pin. The voltage converting circuit is configured to generate a master discharge current signal at the first pin when an output voltage signal is provided at the first pin, and further configured to control the switch module to generate an additional discharge current signal at the first terminal of the switch module.

In accordance with an embodiment of the present invention, a voltage converting integrated circuit comprises a first pin, a second pin, and a third pin configured to provide a switch module control signal. When an output voltage signal is provided at the first pin, the voltage converting circuit is configured to generate a master discharge current signal at the first pin. The switch module control signal is configured to control the switch module to generate an additional discharge current signal at the first pin.

BRIEF DESCRIPTION OF THE DRAWINGS

Non-limiting and non-exhaustive embodiments are described with reference to the following drawings.

The use of the same reference label in different drawings indicates the same or like components.

DETAILED DESCRIPTION

In the present application, numerous specific details are provided, such as examples of circuits, components, and methods, to provide a thorough understanding of embodiments of the invention. These embodiments are exemplary, not to confine the scope of the invention. Persons of ordinary skill in the art will recognize, however, that the invention can be practiced without one or more of the specific details. In other instances, well-known details are not shown or described to avoid obscuring aspects of the invention. Some phrases are used in some exemplary embodiments. However, the usage of these phrases is not confined to these embodiments.

Figure 1:
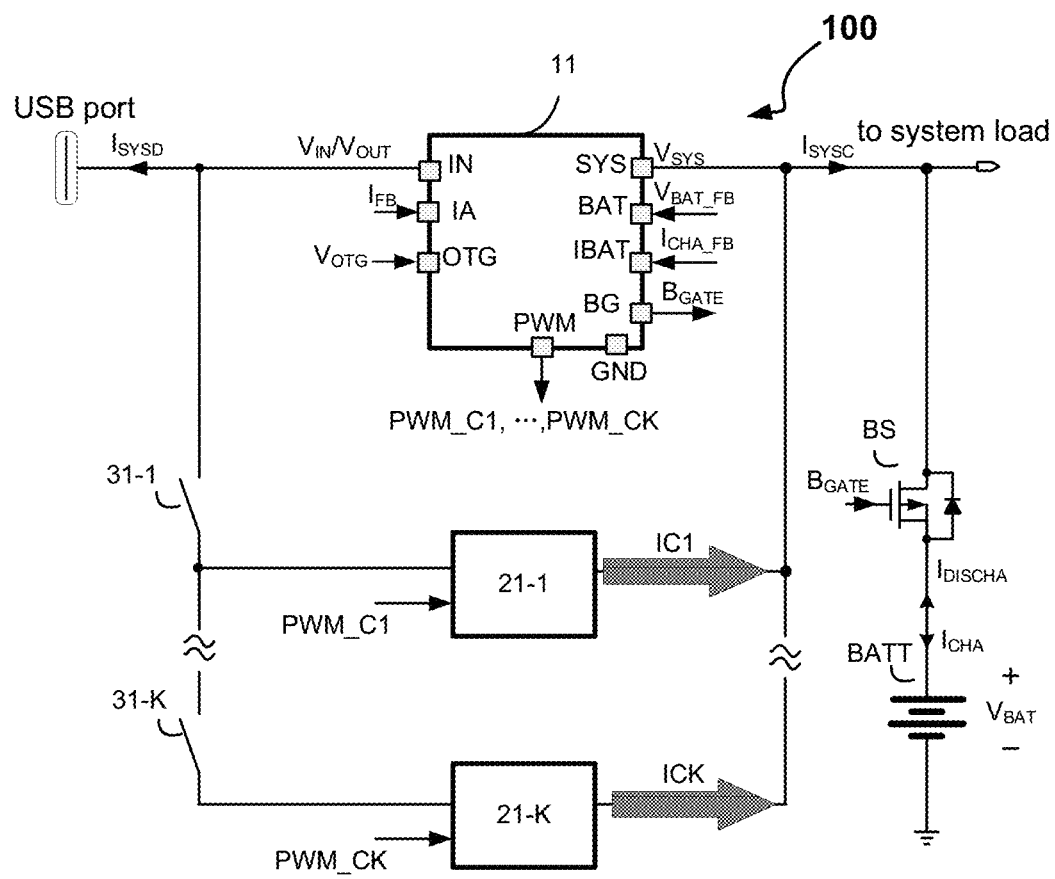
FIG. 1 illustrates a block diagram of a battery current management system 100 in accordance with an embodiment of the present invention.

FIG. 1 illustrates a block diagram of a battery current management system 100 in accordance with an embodiment of the present invention. As shown in FIG. 1, the battery current management system 100 may comprise a voltage converting circuit 11, K switch modules (21-1, ..., 21-K), the battery switch BS and the battery pack BATT, wherein K is an integer equal to or greater than 1. One of ordinary skill in the art would understand that the value of K can be flexibly chosen depending on design specifications without departing from the scope of the present disclosure. In an embodiment, K switch modules (21-1, ..., 21-K) are identical circuits having the same schematic structures and functions. As can also be appreciated by one of ordinary skill in the art, whereas the battery switch BS is illustrated as a Metal Oxide Semiconductor Field Effect Transistors ("MOSFET") in FIG. 1, the battery switch BS may comprise any suitable semiconductor device having a bi-directional blocking function or an unidirectional blocking function, such as Junction Field Effect Transistors ("JFETs"), Insulated Gate Bipolar Translators ("IGBTs") etc.

In the exemplary embodiment of FIG. 1, the voltage converting circuit 11 may comprise a plurality of pins, including but not limited to a port connecting pin IN, a system pin SYS, a battery voltage pin BAT, a battery current pin IBAT, a driving pin BG, a control pin PWM and a ground pin GND. It should be appreciated that the voltage converting circuit 11 may comprise as many pins as needed or desired according to various practical application requirements. The battery pack BATT may comprise any known configuration of one or more battery cells (e.g., a single-cell configuration, a multi-cell configuration, a multi-stack configuration, etc.) and may use any suitable chemistry that allows for recharging.

In the exemplary embodiment of FIG. 1, the port connecting pin IN may be coupled to a USB port. The system pin SYS may be connected to a system load, and further coupled to the battery pack BATT through the battery switch BS. The battery voltage pin BAT of the voltage converting circuit 11 may be configured to receive a battery voltage feedback signal $V_{BAT\_FB}$ indicative of the voltage of the battery pack BATT. The battery current pin IBAT may be configured to receive a battery current feedback signal $I_{CHA\_FB}$ indicative of the current flowing through the battery pack BATT. The driving pin BG may be connected to a control terminal of the battery switch BS, and further configured to provide a driving signal $B_{GATE}$ to drive the battery switch BS to perform on and off switching. The control pin PWM may be configured to provide a plurality of switch module charge control signals (PWM_C1, ..., PWM_CK) to respectively control each of the K switch modules (21-1, ..., 21-K) on and off. The ground pin GND is connected to a logic ground.

In an embodiment, for each j=1, ..., K, the switch module 21-j may have a first terminal, a second terminal and a control terminal. For each j=1, ..., K, the first terminal of the switch module 21-j may be coupled together to the port connecting pin IN, the second terminal of the switch module 21-j may be coupled together to the system pin SYS, and the control terminal of the switch module 21-j may be configured to receive the corresponding switch module charge control signal PWM_Cj. In an embodiment, for each j=1, ..., K, the switch module 21-j may be configured to generate an additional charge current signal ICj to charge the battery pack BATT at its second terminal once it is enabled. As used herein, the term "enable", as applied to the switch module 21-j, means that the switch module 21-j is enable to conduct current which could be otherwise block when the switch module 21-j is disabled.

With continued reference to FIG. 1, the battery current management system 100 may further comprise a mode pin OTG. The voltage converting circuit 11 may be configured to operate in a charge mode or in a discharge mode through setting the mode pin OTG. In an embodiment, the mode pin OTG of the voltage converting circuit 11 may be coupled to an external mode selection indicator to receive an On-The-Go (OTG) signal $V_{OTG}$. In an embodiment, the mode pin OTG may serve to configure the voltage converting circuit 11 to operate in the charge mode or in the discharge mode. In some embodiments, the external mode selection indicator may be a source of a suitable digital signal that can serve to instruct the voltage converting circuit 11 whether to operate in the charge mode or in the discharge mode. In such an application, the OTG signal $V_{OTG}$ is a logic signal having a high logic state and a low logic state. For example, when the OTG signal $V_{OTG}$ is at the high logic state, the voltage converting circuit 11 may be configured to operate in the charge mode, when the OTG signal $V_{OTG}$ is at the low logic state, the voltage converting circuit 11 may be configured to operate in the discharge mode. In other embodiments, the external mode selection indicator may be a source of a suitable analog signal, or a resistive element. For example, a connection to ground potential (i.e., resistance of the resistive element is 0Ω) may serve to instruct the voltage converting circuit 11 should operate in the charge mode while a non-zero resistance value of the resistive element (e.g., 10KΩ, 20KΩ, etc.) may serve to instruct the voltage converting circuit 11 should operate in the discharge mode. In an embodiment, the external mode selection indicator may be part of an external controller, such as a micro programmed control unit (MCU), a single chip microcomputer (SCM), or an embedded controller (EC), etc. That is to say, the external controller may be configured to provide the OTG signal $V_{OTG}$ to the OTG pin of the voltage converting circuit 11 to instruct the voltage converting circuit 11 to operate in the charge mode or in the discharge mode.

When the voltage converting circuit 11 operates in the charge mode, the voltage converting circuit 11 may be configured to receive an input voltage signal $V_{IN}$ provided by an external power supply from the port connecting pin IN, and further configured to generate a system voltage signal $V_{SYS}$ and a master charge current signal $I_{SYSC}$ at its system pin SYS. When the voltage converting circuit 11 operates in the discharge mode, the voltage converting circuit 11 may be configured to generate an output voltage signal $V_{OUT}$ and a master discharge current signal $I_{SYSD}$ at its port connecting pin IN.

In an embodiment, for each j=1, . . . , K, an average value of the additional charge current signal ICj of the corresponding switch module 21-$j$ may be equal to an average value of the master charge current signal $I_{SYSC}$. Herein, for each j=1, . . . , K, the average value of the additional charge current signal ICj is defined as a Root-Mean-Square (RMS) value of the additional charge current signal ICj in one switching period of the battery current management system 100. Herein, the average value of the master charge current signal $I_{SYSC}$ is defined as a RMS value of the master charge current signal $I_{SYSC}$ in one switching period of the battery current management system 100. In other embodiments, the average value of the master charge current signal $I_{SYSC}$ may be integer multiple of the average value of the additional charge current signal ICj. The ratio of the average value of the master charge current signal $I_{SYSC}$ and the average value of the additional charge current signal ICj may depend on a topology of a switching circuit that the voltage converting circuit 11 includes. In an embodiment, when K is larger than 1, the average values of each of the K additional charge current signals (IC1, IC2, . . . , ICK) may be equal to each other.

In the exemplary embodiment of FIG. 1, the battery current management system 100 may be configured to operate in a regular charge state, a regular discharge state and a fast charge state.

When the battery current management system 100 is configured to operate in the regular charge state, the voltage converting circuit 11 may be configured to operate at the charge mode to provide the master charge current signal $I_{SYSC}$ to the battery pack BATT while keep the K switch modules (21-1, . . . , 21-K) disabled. When the battery current management system 100 is configured to operate in the regular discharge state, the battery pack BATT may be discharged through the voltage converting circuit 11 to charge external power sinks connected at the USB port. In such an application, the voltage converting circuit 11 may be configured to operate at the discharge mode to provide the output voltage signal $V_{OUT}$ and the master discharge current signal $I_{SYSD}$ at the port connecting pin IN while keep the K switch modules (21-1, . . . , 21-K) disabled. In an embodiment, the external power sinks may comprise mobile phone, notebook, memory, mouse, power bank, etc. When the battery current management system 100 is configured to operate in the fast charge state, the voltage converting circuit 11 may be configured to operate at the charge mode to provide the master charge current signal $I_{SYSC}$ to the battery pack BATT while at least one switch module of the K switch modules (21-1, . . . , 21-K) is enabled. The enabled switch module is configured to provide the additional charge current signal to charge the battery pack BATT at its second terminal.

In an embodiment, for each j=1, . . . , K, the switch module charge control signal PWM_Cj is configured to determine whether the corresponding switch module 21-$j$ is enabled or disabled. In an embodiment, the voltage converting circuit 11 may be configured to determine whether to enable or disable the plurality of switch modules (21-1, . . . , 21-K) through changing states of the plurality of switch module charge control signals (PWM_C1, . . . , PWM_CK) by itself. For instance, the voltage converting circuit 11 may detect the amplitude of the current signal flowing through its port connecting pin IN, and then determine whether to enable the plurality of switch modules and how many switch modules need to be enabled. If there is no need to enable any switch modules, the battery current management system 100 is configured to operate at the regular charge state. Each of the plurality of switch module charge control signals (PWM_C1, . . . , PWM_CK) may control the corresponding switch module not operating such that only the voltage converting circuit 11 provides the master charge current signal $I_{SYSC}$ at its system port SYS. If at least one switch module needs to be enabled, the battery current management system 100 is configured to operate at the fast charge state. The at least one enabled switch module is configured to provide the additional charge current signal to charge the battery pack BATT at its second terminal. In other embodiments, not the voltage converting circuit 11, but external controllers may be configured to determine whether to enable or disable the plurality of switch modules (21-1, . . . , 21-K) through changing the state of the plurality of switch module charge control signals (PWM_C1, . . . , PWM_CK). In such an application, the voltage converting circuit 11 may further comprise a data pin, e.g., data pin SDA illustrated in FIG. 25. For instance, the external controller may communicate with a USB port controller (not shown, used to monitor and control voltage and current on the USB port) to detect the amplitude of the current signal on the USB port so as to determine whether to enable the plurality of switch modules and how many switch modules need to be enabled. Then the external controller may communicate to the voltage converting circuit 11 through its data pin SDA. The voltage converting circuit 11 may generate the plurality of switch module charge control signals (PWM_C1, . . . , PWM_CK) to enable or disable the plurality of switch modules (21-1, . . . , 21-K) based on commands receiving from the data pin SDA.

In other embodiments, it is irrelevant to the plurality of switch module charge control signals (PWM_C1, ..., PWM_CK) to determine whether enable or disable the plurality of corresponding switch module (21-1, ..., 21-K). Some other devices/elements are adopted to enable and disable the plurality of corresponding switch module (21-1, ..., 21-K). For instance, with reference to FIG. 1, the battery current management system 100 may further comprise a plurality of extra charge switches (31-1, ..., 31-K) each one of which may be configured to enable or disable the corresponding one of the plurality of switch modules (21-1, ..., 21-K). Each one of the plurality of extra charge switches (31-1, ..., 31-K) is corresponding to one of the plurality of switch modules (21-1, ..., 21-K). As shown in FIG. 1, for each j=1, ..., K, the first terminal of the switch module 21-j may be coupled to the port connecting pin IN of the voltage converting circuit 11 through the corresponding extra charge switch 31-j, and the switch module 21-j is enabled when the corresponding extra charge switch 31-j is turned on. In an embodiment, the additional charge current signal ICj is generated through controlling the at least one follower switch of the switch module 21-j on and off once the corresponding extra charge switch 31-j is turned on. Similarly to the battery switch BS, the plurality of extra charge switches (31-1, ..., 31-K) may also comprise any suitable semiconductor devices having the bi-directional blocking function or the unidirectional blocking function, such as MOSFETs, JFETs, or IGBTs, etc. In an embodiment, the plurality of extra charge switches (31-1, ..., 31-K) may be controlled by external controllers. When the battery current management system 100 is configured to operate in the fast charge state, some or all of the plurality of extra charge switches (31-1, ..., 31-K) may be turned on by external controller so as to enable the corresponding switch modules to generate the corresponding additional charge current signals. When the battery current management system 100 is configured to operate in the regular charge state or the regular discharge state, the plurality of extra charge switches (31-1, ..., 31-K) may be turned off by external controller so as to disable the plurality of switch modules (21-1, ..., 21-K).

In the exemplary embodiment of FIG. 1, the voltage converting circuit 11 may comprise a switching circuit which may have both the step-up voltage function and the step-down voltage function. When the voltage across the port connecting pin IN is lower than the system voltage $V_{SYS}$, the switching circuit 11 may be configured to operate in a step-up mode, and when the voltage across the port connecting pin IN is larger than the system voltage $V_{SYS}$, the switching circuit 11 may be configured to operate in a step-down mode. For example, the switching circuit may have a buck-boost topology. When the voltage across the port connecting pin IN is lower than the system voltage $V_{SYS}$, the switching circuit may be configured to operate in a boost mode. When the voltage across the port connecting pin IN is higher than the system voltage $V_{SYS}$, the switching circuit may be configured to operate in a buck mode. When the voltage across the port connecting pin IN is close to the system voltage $V_{SYS}$, the switching circuit may be configured to operate in a buck-boost mode. In other embodiments, the switching circuit may comprise any suitable topologies.

In the exemplary embodiment of FIG. 1, for each j=1, ..., K, the switch module 21-j may comprise at least one follower switch and an follower inductor. The switch module charge control signal PWM_Cj is configured to control the at least one follower switch of the switch module 21-j performing on and off switching to generate the additional charge current signal ICj.

It should be noted that in the embodiment shown in FIG. 1, the battery current management system 100 can freely operate in a combination of three operation states according to the actual applications. For example, in an embodiment, the battery current management system 100 can be configured to only operate in the fast charge state, the OTG pin of the voltage converting circuit 11 can be omitted. In other embodiments, the battery current management system 100 can be configured to have two operation states, e.g., the fast charge state and the regular discharge state.

Figure 2:
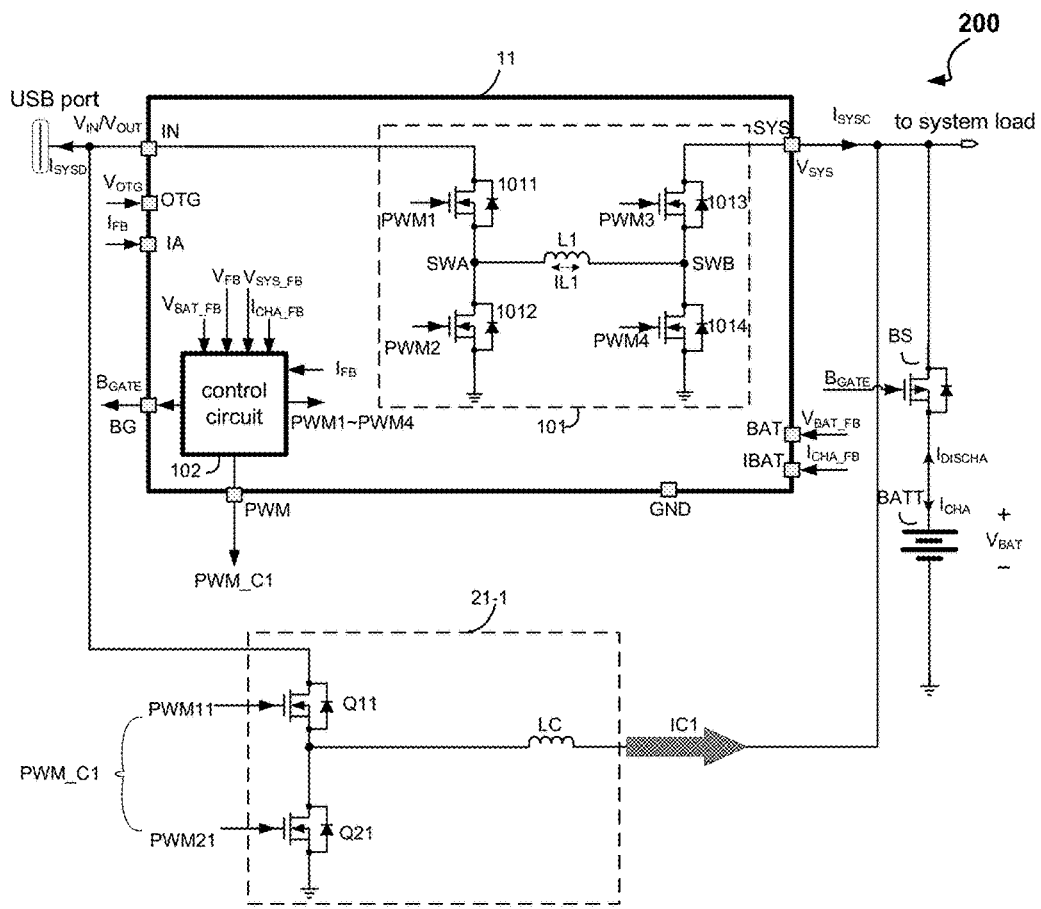
FIG. 2 schematically illustrates a battery current management system 200 in accordance with an embodiment of the present invention.

FIG. 2 schematically illustrates a battery current management system 200 in accordance with an embodiment of the present invention. The battery current management system 200 is a specific embodiment of the battery current management system 100, and only one switch module 21-1 is chosen for illustration. As shown in FIG. 2, the battery current management system 200 may comprise the voltage converting circuit 11, the first switch module 21-1, the battery switch BS and the battery pack BATT.

In the exemplary embodiment of FIG. 2, the first voltage converting circuit 11 may comprise a switching circuit 101 and a control circuit 102. The switching circuit 101 are coupled between the port connecting pin IN and the system pin SYS. The switching circuit 101 is illustrated to have a buck-boost topology comprising the first switch 1011, the second switch 1012, the third switch 1013, the fourth switch 1014 and the inductor L1. The first switch 1011 and the second switch 1012 are connected between the port connecting pin IN and the logic ground. The third switch 1013 and the fourth switch 1014 are connected between the system pin SYS and the logic ground. A common connection of the first switch 1011 and the second switch 1012 is labeled as SWA, and a common connection of the third switch 1013 and the fourth switch 1014 is labeled as SWB. The inductor L1 is connected between the common connection SWA and the common connection SWB.

The control circuit 102 of the voltage converting circuit 11 is configured to receive a voltage feedback signal $V_{FB}$ indicative of voltage on the port connecting pin IN, a system voltage feedback signal $V_{SYS\_FB}$ indicative of the system voltage feedback signal $V_{SYS}$, the battery voltage feedback signal $V_{BAT\_FB}$ and the battery current feedback signal $I_{CHA\_FB}$, and further configured to generate the control signals PWM1-PWM4, the switch module charge control signal PWM_C1 and the driving signal $B_{GATE}$ based on the voltage feedback signal $V_{FB}$, the system voltage feedback signal $V_{SYS\_FB}$, the battery voltage feedback signal $V_{BAT\_FB}$, and the battery current feedback signal $I_{CHA\_FB}$. The control signals PWM1-PWM4 are configured to respectively control the switches 1011-1014 to perform on and off switching. In an embodiment, when the voltage converting circuit 11 is configured to operate at the charge mode, the port connecting pin IN receives the input voltage signal $V_{IN}$ from the USB port such that the voltage feedback signal $V_{FB}$ is indicative of the input voltage signal $V_{IN}$. When the voltage converting circuit 11 is configured to operate at the discharge mode, the port connecting pin IN provides the output voltage signal $V_{OUT}$ to the USB port such that the voltage feedback signal $V_{FB}$ is indicative of the output voltage signal $V_{OUT}$. In other embodiments, the control circuit 102 of the voltage converting circuit 11 is further configured to receive a current feedback signal $I_{FB}$ from a current sense pin IA, wherein the current feedback signal $I_{FB}$ is indicative of current flowing through the port connecting pin IN. In an embodiment, when the voltage converting circuit 11 is configured to operate at the charge mode, the current feedback signal $I_{FB}$ is indicative of a current signal flowing into the port connecting pin IN. When the voltage converting circuit 11 is configured to operate at discharge mode, the current feedback signal $I_{FB}$ is indicative of a current signal flowing out the port connecting pin IN, e.g., the master discharge current signal $I_{SYSD}$. In such an application, the control circuit 102 of the voltage converting circuit 11 is configured to generate the control signals PWM1-PWM4, the switch module charge control signal PWM_C1 and the driving signal $B_{GATE}$ based on the voltage feedback signal $V_{FB}$, the current feedback signal $I_{FB}$, the system voltage feedback signal $V_{SYS\_FB}$, the battery voltage feedback signal $V_{BAT\_FB}$, and the battery current feedback signal $I_{CHA\_FB}$.

With continued reference to FIG. 2, the first terminal of the first switch module 21-1 may be coupled to the port connecting pin IN of the voltage converting circuit 11, the second terminal of the first switch module 21-1 may be coupled to the system pin SYS of the voltage converting circuit 11. In the exemplary embodiment of FIG. 2, the first switch module 21-1 may comprise a first follower switch Q11, a second follower switch Q21 and a follower inductor LC. The first follower switch Q11 and the second follower switch Q21 are coupled in series between the first terminal of the first switch module 21-1 and the logic ground. The follower inductor LC may be coupled between the second terminal of the first switch module 21-1 and a common connection of the first follower switch Q11 and the second follower switch Q21. In an embodiment, inductance of the follower inductor LC is equal to that of the inductor L1. The switch module charge control signal PWM_C1 may comprise a first follower switch control signal PWM11 and a second follower switch control signal PWM21. The first follower switch control signal PWM11 is configured to control the first follower switch Q11 on and off; and the second follower switch control signal PWM21 is configured to control the second follower switch Q21 on and off. Noted that the extra charge switch 31-1 of FIG. 1 is omitted in the embodiment of FIG. 2 since enabling the first switch module 21-1 is executed by the first follower switch control signal PWM11 and the second follower switch control signal PWM21.

When the battery current management system 200 is configured to operate in the regular charge state, the voltage converting circuit 11 may be configured to provide the master charge current signal $I_{SYSC}$ at its system pin SYS while keep the first switch module 21-1 disabled. In accordance with the present disclosure, there are many ways to disable the first switch module 21-1. In an embodiment, the first switch module 21-1 may be disabled through setting the first follower switch control signal PWM11 and the second follower switch control signal PWM21 in Hi-Z state in which the first follower switch Q11 and the second follower switch Q21 are unable to be turned on or off. In an embodiment, the Hi-Z states of the first follower switch control signal PWM11 and the second follower switch control signal PWM21 means the states of the first follower switch control signal PWM11 and the second follower switch control signal PWM21 are neither a logic high state nor a logic low state. In the other embodiment, the first switch module 21-1 may be disabled through setting the first follower switch Q11 and the second follower switch Q21 in Hi-Z state in which the control terminals of the first follower switch Q11 and the second follower switch Q21 are floating. Further in another embodiment, the first switch module 21-1 may be disabled through turning the first follower switch Q11 and the second follower switch Q21 off.

When the battery current management system 200 is configured to operate in the regular discharge state, the voltage converting circuit 11 may be configured to provide the master discharge current signal $I_{SYSD}$ at its port connecting pin IN while keep the first switch module 21-1 disabled.

When the battery current management system 200 is configured to operate in the fast charge state, the voltage converting circuit 11 may be configured to provide the master charge current signal $I_{SYSC}$ at its system pin SYS while the first switch module 21-1 is enabled to provide the additional charge current signal IC1 to charge the battery pack BATT at its second terminal. In an embodiment, when the input voltage signal $V_{IN}$ is larger than the system voltage signal $V_{SYS}$, the switching circuit 101 of the voltage converting circuit 11 is operated at the step-down mode. The third switch 1013 is turned on and the fourth switch 1014 is turned off, while the first switch 1011 and the second switch 1012 have complementary on and off states, i.e., the first switch 1011 is on while the second switch 1012 is off, vice versa. In an embodiment, the first follower switch control signal PWM11 is synchronized with the first control signal PWM1, i.e., the first follower switch Q11 is synchronized on and off with the first switch 1011. The second follower switch control signal PWM21 is synchronized with the second control signal PWM2, i.e., the second follower switch Q21 is synchronized on and off with the second switch 1012. In an alternative embodiment, the first follower switch control signal PWM11 and the first control signal PWM1 have a phase shift of 180°, i.e., the first follower switch Q11 and the first switch 1011 are interleaved to turn on and off. The second follower switch control signal PWM21 and the second control signal PWM2 also have the phase shift of 180°, i.e., the second follower switch Q21 and the second switch 1012 are interleaved to turn on and off. When the input voltage signal $V_{IN}$ is smaller than the system voltage signal $V_{SYS}$, the switching circuit 101 of the voltage converting circuit 11 is operated at the step-up mode while the first switch module 21-1 is disabled. The first control signal PWM1 controls the first switch 1011 on and the second control signal PWM2 controls the second switch 1012 off, while the control signals PWM3 and PWM4 control the third switch 1013 and the fourth switch 1014 to have complementary on and off states.

As can be appreciated, while only one switch module 21-1 is chosen for illustration in FIG. 2, there may have any suitable quantities of switch modules in different applications. In a battery current management system comprising K switch modules (21-1, . . . , 21-K) which are enabled in the fast charge state, when the input voltage signal $V_{IN}$ is larger than the system voltage signal $V_{SYS}$, every two successively neighboring control signals among the first follower switch control signals PWM11 of the plurality of switch modules (21-1, . . . , 21-K) and the first control signal PWM1 may be synchronized or have a predetermined identical phase shift of 360°/(K+1) in sequence. Meanwhile, every two successively neighboring control signals among the second follower switch control signals PWM21 of the plurality of switch modules (21-1, . . . , 21-K) and the second control signal PWM2 may be synchronized or have the predetermined identical phase shift of 360°/(K+1) in sequence. For example, if K=2, the first control signal PWM1 and the first follower switch control signal PWM11 of the first switch module 21-1 have a phase shift of 120°; the first follower switch control signal PWM11 of the first switch module 21-1 and the first follower switch control signal PWM11 of the second switch module 21-2 have the phase shift of 120°; and the first follower switch control signal PWM11 of the second switch module 21-2 and the first control signal PWM1 have the phase shift of 120°. Meanwhile, the second control signal PWM2 and the second follower switch control signal PWM21 of the first switch module 21-1 have the phase shift of 120°; the second follower switch control signal PWM21 of the first switch module 21-1 and the second follower switch control signal PWM21 of the second switch module 21-2 have the phase shift of 120°; and the second follower switch control signal PWM21 of the second switch module 21-2 and the second control signal PWM2 have the phase shift of 120°. And so forth.

Figure 3:
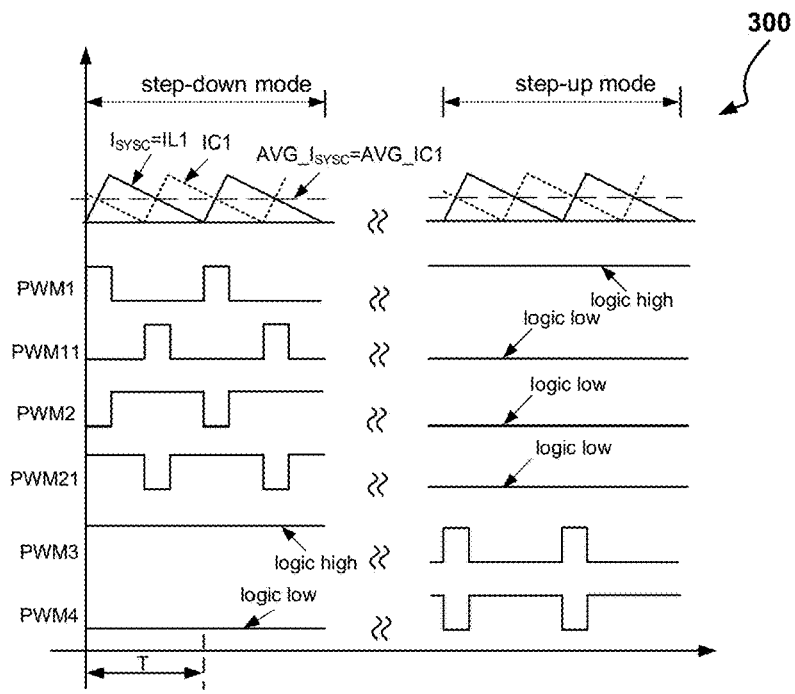
FIG. 3 illustrates an operation waveform diagram 300 illustrating operation of the battery current management system 200 in accordance with an embodiment of the present invention.

FIG. 3 illustrates an operation waveform diagram 300 illustrating operation of the battery current management system 200 in accordance with an embodiment of the present invention. As shown in FIG. 3, the waveforms diagram 300 illustrates an inductor current signal IL1 flowing through the inductor L1, the additional charge current signal IC1, the first control signal PWM1, the first follower switch control signal PWM11, the second control signal PWM2, the second follower switch control signal PWM21, the third control signal PWM3 and the fourth control signal PWM4 from top to bottom.

As shown in FIG. 3, during step-down mode, the first and the second control signals PWM1 and PWM2 have complementary logic states, the third control signal PWM3 is logic high (the third switch 1013 is on), and the fourth control signal PWM4 is logic low (the fourth switch 1014 is off). At the same time, the first follower switch control signal PWM11 logs behind the first control signal PWM1 with the phase of 180°, and the second follower switch control signal PWM21 logs behind the second control signal PWM2 with the phase of 180°.

During the step-up mode, the third and fourth control signals PWM3 and PWM4 have complementary logic states, the first control signal PWM1 is logic high (the first switch 1011 is on), and the second control signal PWM2 is logic low (the second switch 1012 is off). At the same time, both the first follower switch control signal PWM11 and the second follower switch control signal PWM21 are logic low so that the first switch module 21-1 is disabled. As can be known from the operation waveform diagram 300, the average value AVG_$I_{SYSC}$ of the master charge current signal $I_{SYSC}$ is equal to the average value AVG_IC1 of the additional charge current signal IC1 of the first switch module 21-1.

Figure 4:
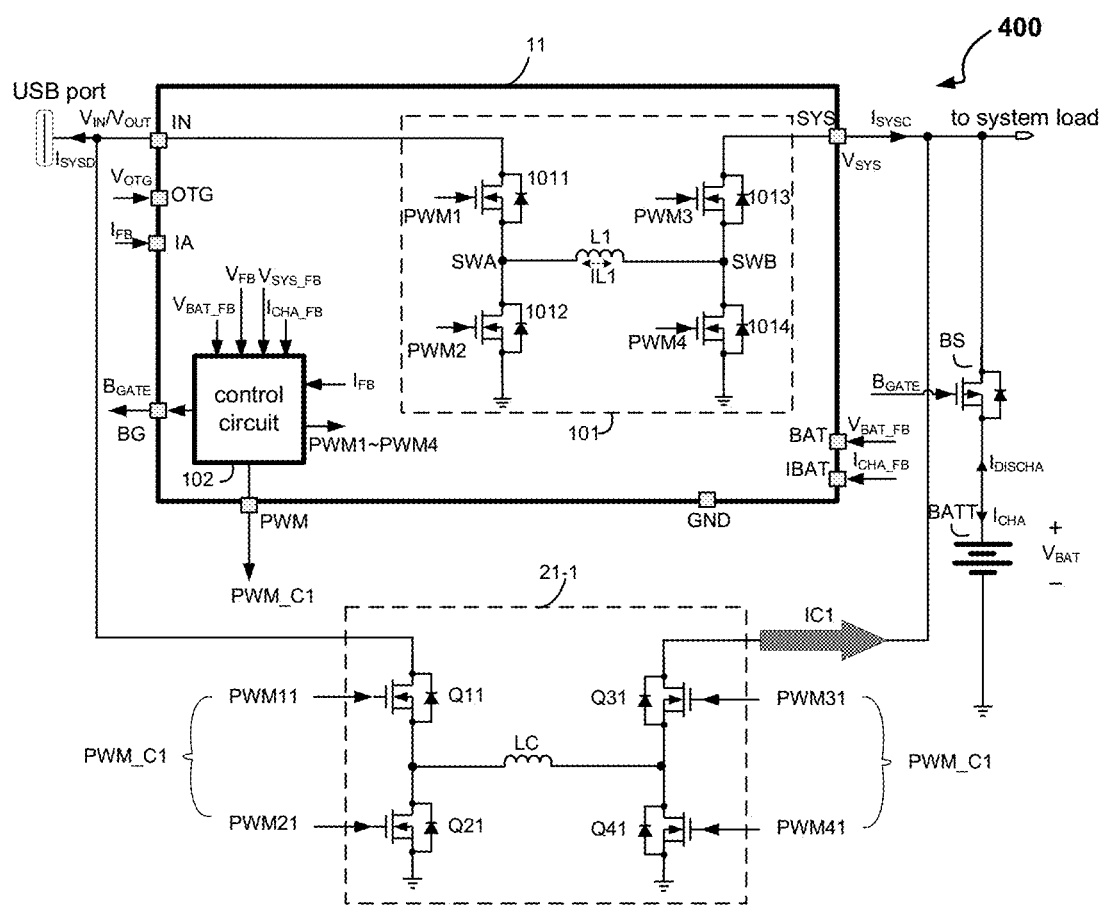
FIG. 4 schematically illustrates a battery current management system 400 in accordance with an embodiment of the present invention.

FIG. 4 schematically illustrates a battery current management system 400 in accordance with an embodiment of the present invention. Compared with the first switch module 21-1 of the battery current management system 200 of FIG. 2, the first switch module 21-1 of the battery current management system 400 may be illustrated to have a different topology. As shown in FIG. 4, the first switch module 21-1 may comprise a third follower switch Q31 and a fourth follower switch Q41 as well as the first follower switch Q11, the second follower switch Q21 and the follower inductor LC. The first follower switch Q11 and the second follower switch Q21 are coupled in series between the first terminal of the first switch module 21-1 and the logic ground. The third follower switch Q31 and the fourth follower switch Q41 are coupled in series between the second terminal of the first switch module 21-1 and the logic ground. The follower inductor LC may be coupled between the common connection of the first follower switch Q11 and the second follower switch Q21 and a common connection of the third follower switch Q31 and the fourth follower switch Q41. In the embodiment of FIG. 4, the switch module charge control signal PWM_C1 may comprise a third follower switch control signal PWM31 and a fourth follower switch control signal PWM41 as well as the first follower switch control signal PWM11 and the second follower switch control signal PWM21. The third follower switch control signal PWM31 is configured to control the third follower switch Q31 on and off; and the fourth follower switch control signal PWM41 is configured to control the fourth follower switch Q41 on and off.

When the battery current management system 400 is configured to operate in the regular charge state, the voltage converting circuit 11 may be configured to provide the master charge current signal $I_{SYSC}$ at its system pin SYS while keep the first switch module 21-1 disabled.

When the battery current management system 400 is configured to operate in the regular discharge state, the voltage converting circuit 11 may be configured to provide the master discharge current signal $I_{SYSD}$ at its port connecting pin IN while keep the first switch module 21-1 disabled.

When the battery current management system 400 is configured to operate in the fast charge state, the voltage converting circuit 11 may be configured to provide the master charge current signal $I_{SYSC}$ at its system pin SYS while the first switch module 21-1 is enabled to provide the additional charge current signal IC1 to charge the battery pack BATT at its second terminal. In an embodiment, when the input voltage signal $V_{IN}$ is larger than the system voltage signal $V_{SYS}$, the switching circuit 101 of the voltage converting circuit 11 is operated at the step-down mode. The third switch 1013 is turned on and the fourth switch 1014 is turned off, while the first switch 1011 and the second switch 1012 are complementary on and off. The first follower switch Q11 is synchronized or interleaved on and off with the first switch 1011. The second follower switch Q21 is synchronized or interleaved on and off with the second switch 1012. The third follower switch Q31 is turned on and the fourth follower switch Q41 is turned off. When the input voltage signal $V_{IN}$ is smaller than the system voltage signal $V_{SYS}$, the switching circuit 101 of the voltage converting circuit 11 is operated at the step-up mode. The first switch 1011 is turned on and the second switch 1012 is turned off, while the third switch 1013 and the fourth switch 1014 have complementary on and off states. The first follower switch Q11 is turned on and the second follower switch Q21 is turned off. The third follower switch Q31 is synchronized or interleaved on and off with the second switch 1013. The fourth follower switch Q41 is synchronized or interleaved on and off with the fourth switch 1014.

As can be appreciated, while only one switch module 21-1 is chosen for illustration in FIG. 4, there may have any suitable quantities of switch modules in different applications. In a battery current management system comprising K switch modules (21-1, ..., 21-K), if all of the K switch modules (21-1, ..., 21-K) are enabled in the fast charge state and the input voltage signal $V_{IN}$ is larger than the system voltage signal $V_{SYS}$, every two successively neighboring control signals among the first follower switch control signals PWM11 of the plurality of switch modules (21-1, ..., 21-K) and the first control signal PWM1 may be synchronized or have the predetermined identical phase shift of 360°/(K+1) in sequence. Meanwhile, every two successively neighboring control signals among the second follower switch control signals PWM21 of the plurality of switch modules (21-1, ..., 21-K) and the second control signal PWM2 may be synchronized or have the predetermined identical phase shift of 360°/(K+1) in sequence. The third follower switch control signals PWM31 of the plurality of switch modules (21-1, ..., 21-K) and the third control signal PWM3 may be synchronized. The fourth follower switch control signals PWM41 of the plurality of switch modules (21-1, . . . , 21-K) and the fourth control signal PWM4 may be synchronized. If all of the K switch modules (21-1, . . . , 21-K) are enabled and the input voltage signal $V_{IN}$ is smaller than the system voltage signal $V_{SYS}$, the first follower switch control signals PWM11 of the plurality of switch modules (21-1, . . . , 21-K) and the first control signal PWM1 may be synchronized. Meanwhile, the second follower switch control signals PWM21 of the plurality of switch modules (21-1, . . . , 21-K) and the second control signal PWM2 may be synchronized. Every two successively neighboring control signals among the third follower switch control signals PWM31 of the plurality of switch modules (21-1, . . . , 21-K) and the third control signal PWM3 may be synchronized or have the predetermined identical phase shift of 360°/(K+1) in sequence. Every two successively neighboring control signals among the fourth follower switch control signals PWM41 of the plurality of switch modules (21-1, . . . , 21-K) and the fourth control signal PWM4 may be synchronized or have the predetermined identical phase shift of 360°/(K+1) in sequence.

In the exemplary embodiment of FIG. 4, the voltage converting circuit 11 is configured to control the first switch module 21-1 to provide the additional charge current signal IC1 through controlling the first follower switch Q11, the second follower switch Q21, the third follower switch Q31 and the fourth follower switch Q41 to perform on and off switching.

Figure 5:
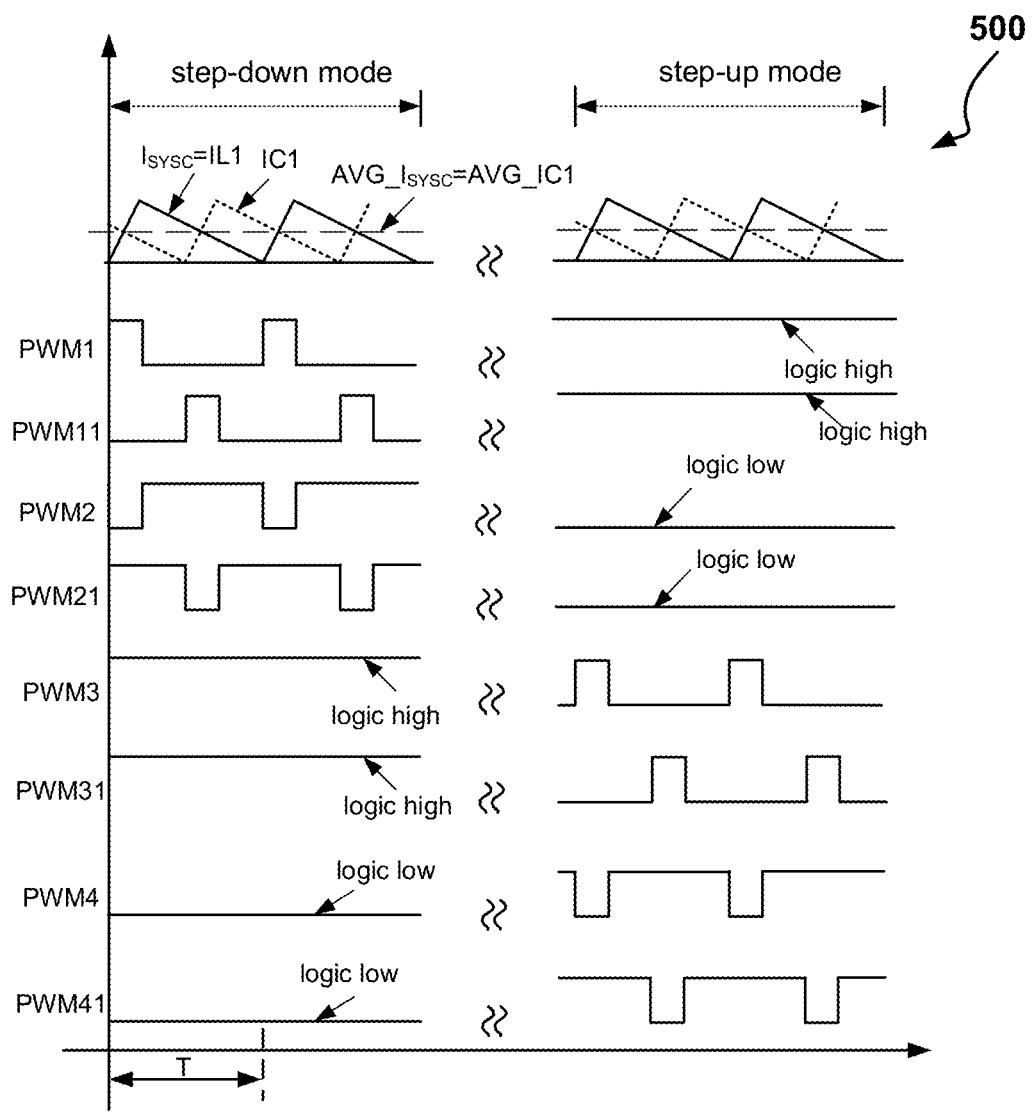
FIG. 5 illustrates an operation waveform diagram 500 illustrating operation of the battery current management system 400 in accordance with an embodiment of the present invention.

FIG. 5 illustrates an operation waveform diagram 500 illustrating operation of the battery current management system 400 in accordance with an embodiment of the present invention. As shown in FIG. 5, the waveforms diagram 500 illustrates the inductor current signal IL1, the additional charge current signal IC1, the first control signal PWM1, the first follower switch control signal PWM11, the second control signal PWM2, the second follower switch control signal PWM21, the third control signal PWM3, the third follower switch control signal PWM31, the fourth control signal PWM4, and the fourth follower switch control signal PWM41 from top to bottom.

As shown in FIG. 5, during step-down mode, the first and the second control signals PWM1 and PWM2 have complementary logic states, the third control signal PWM3 is logic high (the third switch 1013 is on), and the fourth control signal PWM4 is logic low (the fourth switch 1014 is off). The first follower switch control signal PWM11 logs behind the first control signal PWM1 with the phase of 180°, the second follower switch control signal PWM21 logs behind the second control signal PWM2 with the phase of 180°. Meanwhile, the third follower switch control signal PWM31 is logic high (the third change switch Q31 is on), and the fourth follower switch control signal PWM41 is logic low (the fourth switch Q41 is off).

During this step-up mode, the third and the fourth control signals PWM3 and PWM4 have complementary logic states, the first control signal PWM1 is logic high (the first switch 1011 is on), and the second control signal PWM2 is logic low (the second switch 1012 is off). The first follower switch control signal PWM11 is logic high (the third change switch Q11 is on), the second follower switch control signal PWM21 is logic low (the fourth switch Q21 is off). Meanwhile, the third follower switch control signal PWM31 logs behind the third control signal PWM3 with the phase of 180°, and the fourth follower switch control signal PWM41 logs behind the fourth control signal PWM4 with the phase of 180°. As can be known from the operation waveform diagram 500, the average value $AVG\_I_{SYSC}$ of the master charge current signal $I_{SYSC}$ is equal to the average value $AVG\_IC1$ of the additional charge current signal IC1 of the first switch module 21-1.

Figure 6:
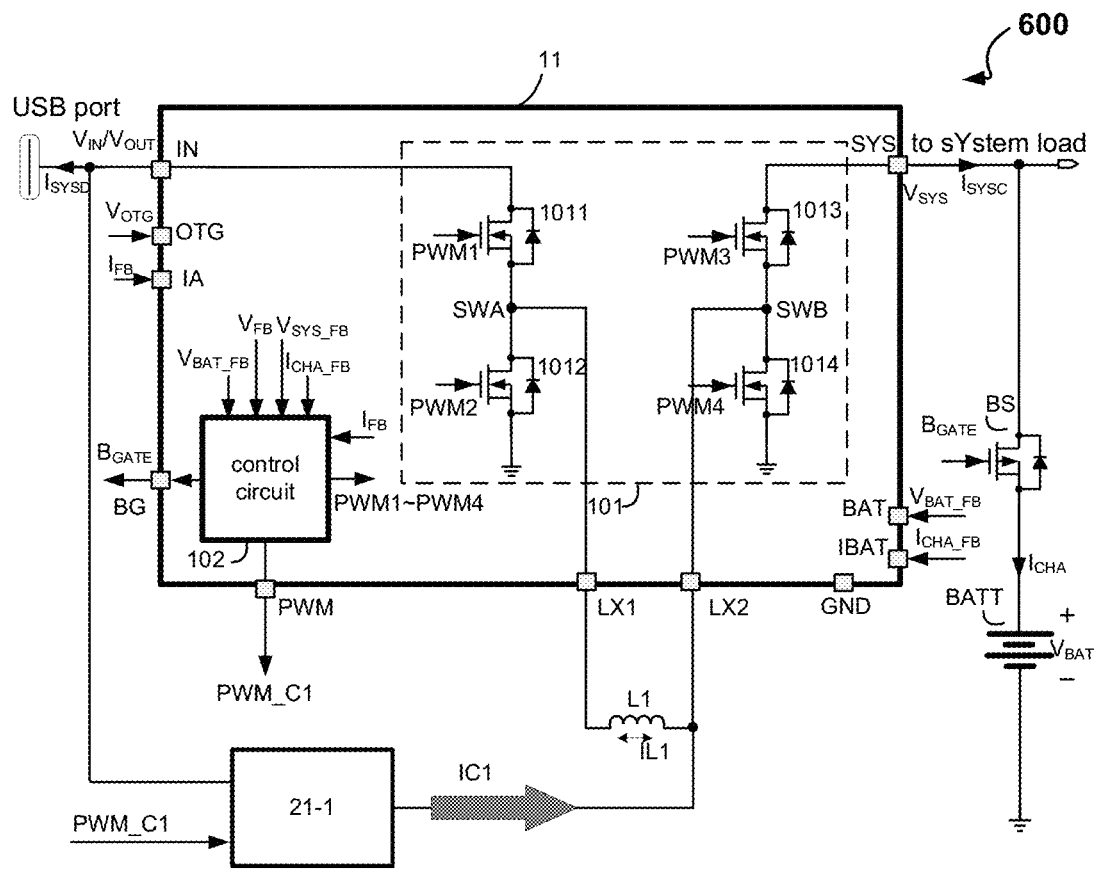
FIG. 6 schematically illustrates a battery current management system 600 in accordance with an embodiment of the present invention.

FIG. 6 schematically illustrates a battery current management system 600 in accordance with an embodiment of the present invention. Compared to the voltage converting circuit 11 of the battery current management systems 200 and 400, the voltage converting circuit 11 of the battery current management system 600 may further comprise a first inductor pin LX1 and a second inductor pin LX2. In the battery current management system 600, the inductor L1 of the voltage converting circuit 11 is arranged to be connected external of the voltage converting circuit 11 between the first inductor pin LX1 and the second inductor pin LX2, rather than internal of the voltage converting circuit 11. In the battery current management system 600, arranging the inductor L1 external of the voltage converting circuit 11 is in favour of thermal dissipation of the voltage converting circuit 11. In the exemplary embodiment of FIG. 6, the second terminal of the first switch module 21-1 is illustrated to be connected to the second inductor pin LX2, and further coupled to the system pins SYS through the second inductor pin LX2 and the third switch 1013. As can be appreciated, in an alternative embodiment, the second terminal of the first switch module 21-1 can be directly connected to the system pins SYS.

Figure 7:
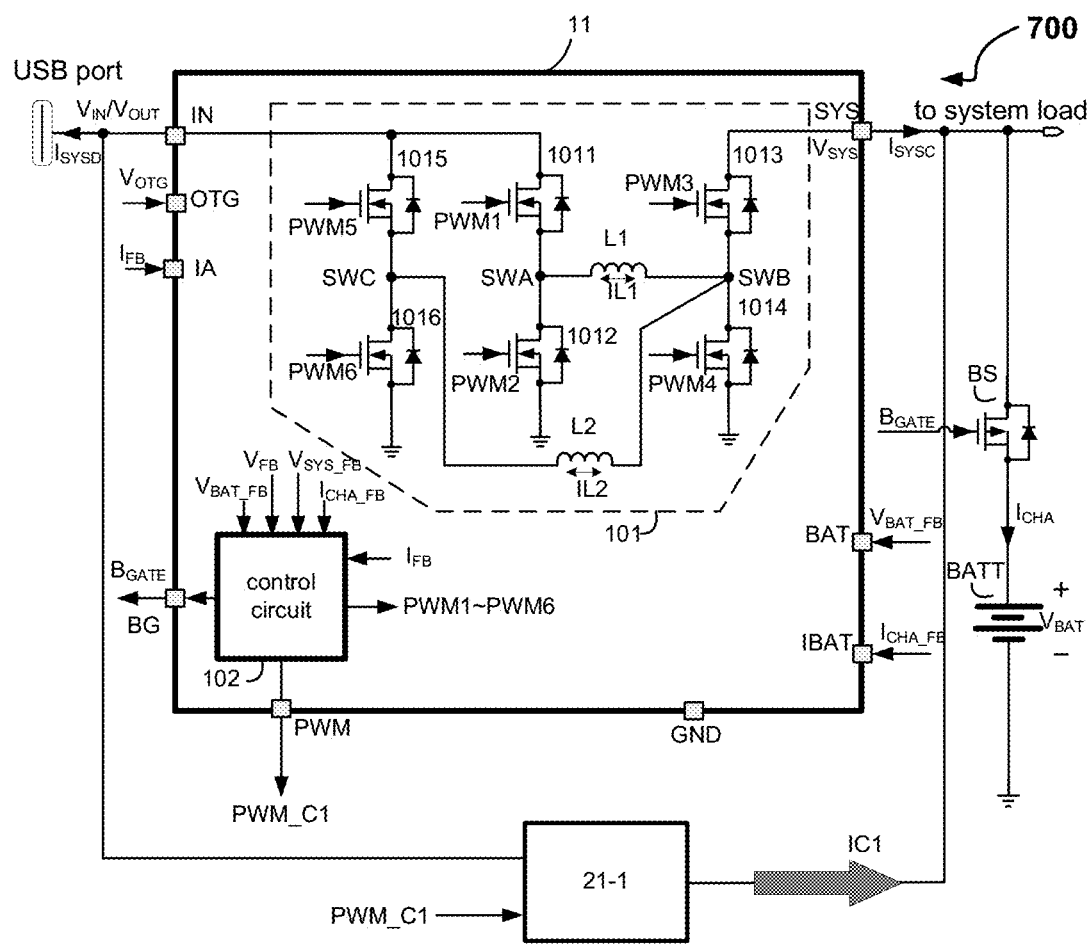
FIG. 7 schematically illustrates a battery current management system 700 in accordance with an embodiment of the present invention.

FIG. 7 schematically illustrates a battery current management system 700 in accordance with an embodiment of the present invention. Compared to the switching circuits 101 of the battery current management systems 200 and 400, the switching circuit 101 of the battery current management system 700 may be illustrated to have a different topology. Specifically, the switching circuit 101 of the battery current management system 700 may further comprise a fifth switch 1015, a sixth switch 1016, and an inductor L2 as well as the first switch 1011, the second switch 1012, the third switch 1013, the fourth switch 1014 and the inductor L1. The first switch 1011 and the second switch 1012 are connected between the port connecting pin IN and the logic ground. The third switch 1013 and the fourth switch 1014 are connected between the system pin SYS and the logic ground. The fifth switch 1015 and the sixth switch 1016 are connected between the port connecting pin IN and the logic ground. The common connection of the first switch 1011 and the second switch 1012 is labeled as SWA, the common connection of the third switch 1013 and the fourth switch 1014 is labeled as SWB, and a common connection of the fifth switch 1015 and the sixth switch 1016 is labeled as SWC. The inductor L1 is connected between the common connection SWA and the common connection SWB, and the inductor L2 is connected between the common connection SWC and the common connection SWB.

The control circuit 102 of FIG. 7 is configured to receive the voltage feedback signal $V_{FB}$, the system voltage feedback signal $V_{SYS\_FB}$, the battery voltage feedback signal $V_{BAT\_FB}$ and the battery current feedback signal $I_{CHA\_FB}$, and further configured to generate control signals PWM1-PWM6, the switch module charge control signal PWM_C1 and the driving signal $B_{GATE}$ based on the voltage feedback signal $V_{FB}$, the system voltage feedback signal $V_{SYS\_FB}$, the battery voltage feedback signal $V_{BAT\_FB}$, and the battery current feedback signal $I_{CHA\_FB}$. The control signals PWM1-PWM6 are configured to respectively control the switches 1011-1016 of the voltage converting circuit 11 to perform on and off switching.

The topology of the first switch module 21-1 of FIG. 7 can be the same as either the topology of the first switch module 21-1 shown in FIG. 2 or the topology of the first switch module 21-1 in FIG. 4. Next, the operating principle of the battery current management system 700 will be introduced in a hypothesis the topology of the first switch module 21-1 of FIG. 2 is adopted, i.e., the first switch module 21-1 only comprises the first follower switch Q11, the second follower switch Q21 and the follower inductor LC.

When the battery current management system 700 is configured to operate in the fast charge state, the voltage converting circuit 11 may be configured to provide the master charge current signal $I_{SYSC}$ at its system pin SYS while the first switch module 21-1 is enabled to provide the additional charge current signal IC1 to charge the battery pack BATT at its second terminal. In an embodiment, when the input voltage signal $V_{IN}$ is larger than the system voltage signal $V_{SYS}$, the switching circuit 101 of the voltage converting circuit 11 is operated at the step-down mode. The third switch 1013 is on and the fourth switch 1014 is off, while the first switch 1011 and the second switch 1012 have complementary on and off states, and the fifth switch 1015 and the sixth switch 1016 are complementary on and off. In an embodiment, the first control signal PWM1, the fifth control signal PWM5 and the first follower switch control signal PWM11 are synchronized, i.e., the first follower switch Q11, the first switch 1011 and the fifth switch 1015 are synchronized on and off. The second control signal PWM2, the sixth control signal PWM6 and the second follower switch control signal PWM21 are synchronized, i.e., the second follower switch Q21, the second switch 1012 and the sixth switch 1016 are synchronously turned on and off. In an alternative embodiment, the first control signal PWM1, the fifth control signal PWM5 and the first follower switch control signal PWM11 may have the predetermined identical phase shift of 120° in sequence, i.e., the first follower switch Q11, the first switch 1011 and the fifth switch 1015 are interleaved on and off in sequence. The second control signal PWM2, the sixth control signal PWM6 and the second follower switch control signal PWM21 may have the predetermined identical phase shift of 120° in sequence, i.e., the second follower switch Q21, the second switch 1012 and the sixth switch 1016 are interleaved on and off in sequence.

As can also be appreciated, while only one switch module 21-1 is chosen for illustration in FIG. 7, there may have any suitable quantities of switch modules in different applications. In the battery current management system comprising K switch modules (21-1, . . . , 21-K) which are enabled in the fast charge state, when the input voltage signal $V_{IN}$ is larger than the system voltage signal $V_{SYS}$, the first control signal PWM1, the fifth control signal PWM5 and every two successively neighboring control signals among the first follower switch control signals PWM11 of the plurality of switch modules (21-1, . . . , 21-K) may have a predetermined identical phase shift of 360°/(K+2) in sequence. Meanwhile, the second control signal PWM2, the sixth control signal PWM6 and every two successively neighboring control signals among the second follower switch control signals PWM21 of the plurality of switch modules (21-1, . . . , 21-K) may have the predetermined identical phase shift of 360°/(K+2) in sequence. For example, if K=2, the first control signal PWM1 and the fifth control signal PWM5 have a phase shift of 90°; the fifth control signal PWM5 and the first follower switch control signal PWM11 of the first switch module 21-1 have the phase shift of 90°; the first follower switch control signal PWM11 of the first switch module 21-1 and the first follower switch control signal PWM11 of the second switch module 21-2 have the phase shift of 90°; and the first follower switch control signal PWM11 of the second switch module 21-2 and the first control signal PWM1 have the phase shift of 90°. Meanwhile, the second control signal PWM2 and the sixth control signal PWM6 have the phase shift of 90°; the sixth control signal PWM6 and the second follower switch control signal PWM21 of the first switch module 21-1 have the phase shift of 90°; the second follower switch control signal PWM21 of the first switch module 21-1 and the second follower switch control signal PWM21 of the second switch module 21-2 have the phase shift of 90°; and the second follower switch control signal PWM21 of the second switch module 21-2 and the second control signal PWM2 have the phase shift of 90°. And so forth.

In the exemplary embodiment of FIG. 7, the voltage converting circuit 11 may be configured to provide the master charge current signal $I_{SYSC}$ which is the sum of the inductor current signal IL1 and an inductor current signal IL2 flowing through inductor L2. The first switch module 21-1 may be configured to provide the additional charge current signal IC1 at its second terminal. In the exemplary embodiment of FIG. 7, the average value of the master charge current signal $I_{SYSC}$ is twice of the average value of the additional charge current signal IC1 of the first switch module 21-1.

Figure 8:
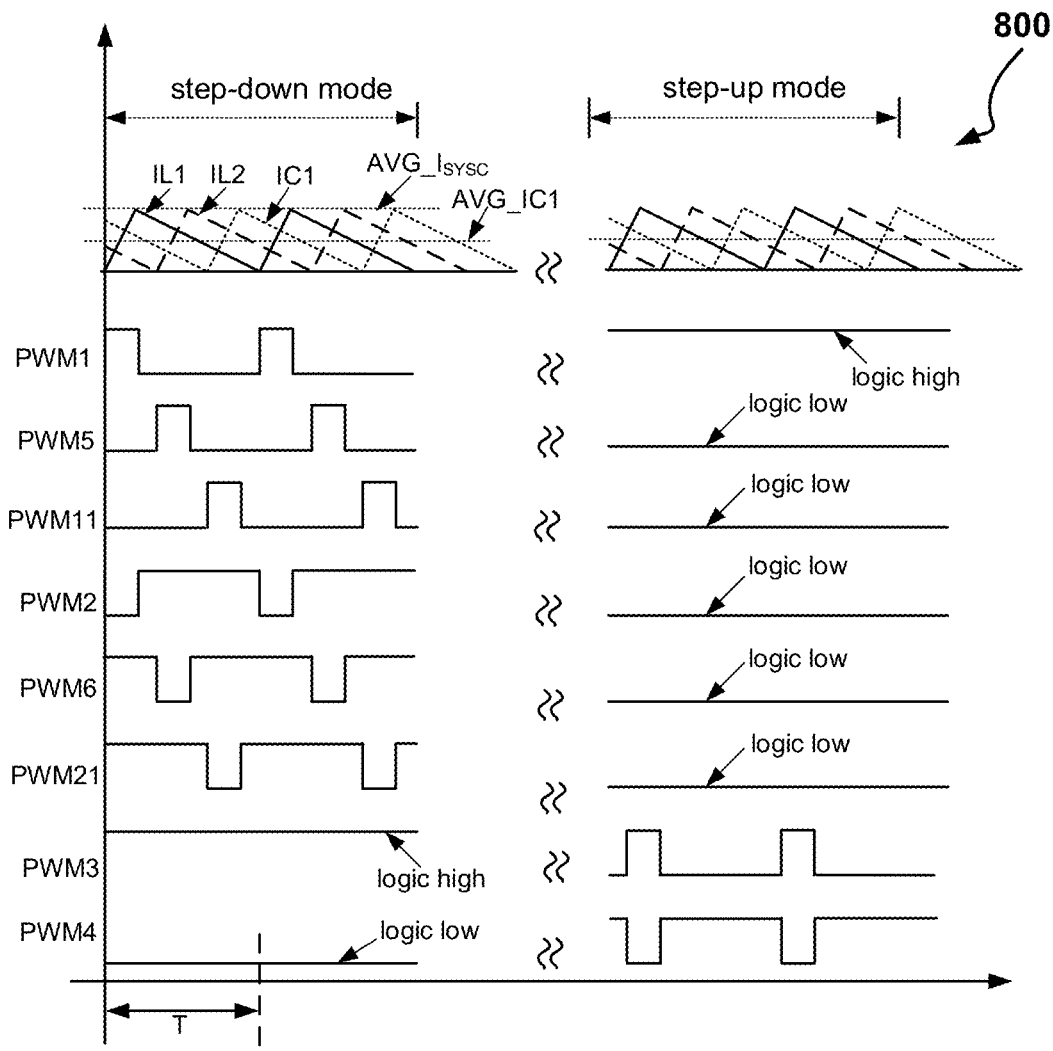
FIG. 8 illustrates an operation waveform diagram 800 illustrating operation of the battery current management system 700 in accordance with an embodiment of the present invention.

FIG. 8 illustrates an operation waveform diagram 800 illustrating operation of the battery current management system 700 in accordance with an embodiment of the present invention. As shown in FIG. 8, the waveforms diagram 800 illustrates the inductor current signal IL1, the inductor current signal IL2, the additional charge current signal IC1, the first control signal PWM1, the fifth control signal PWM5, the first follower switch control signal PWM11, the second control signal PWM2, the sixth control signal PWM6, the second follower switch control signal PWM21, the third control signal PWM3, and the fourth control signal PWM4 from top to bottom.

As shown in FIG. 8, during step-down mode, the first and the second control signals PWM1 and PWM2 have complementary logic states, the fifth control signal PWM5 and the sixth control signal PWM6 have complementary logic states, the third control signal PWM3 is logic high (the third switch 1013 is on), and the fourth control signal PWM4 is logic low (the fourth switch 1014 is off). The fifth control signal PWM5 logs behind the first control signal PWM1 with the phase of 120°, the first follower switch control signal PWM11 logs behind the fifth control signal PWM5 with the phase of 120°. Meanwhile, the sixth control signal PWM6 logs behind the second control signal PWM2 with the phase of 120°, and the second follower switch control signal PWM21 logs behind the sixth control signal PWM6 with the phase of 120°.

During this step-up mode, the third and the fourth control signals PWM3 and PWM4 have complementary logic states, the first control signal PWM1 is logic high (the first switch 1011 is on), and the second control signal PWM2 is logic low (the second switch 1012 is off). At the same time, the first follower switch control signal PWM11, the second follower switch control signal PWM21, the fifth and the sixth control signals PWM5 and PWM6 are logic low. As can also be known from the operation waveform diagram 800, the average value $AVG\_I_{SYSC}$ of the master charge current signal $I_{SYSC}$ is twice of the average value AVG_IC1 of the additional charge current signal IC1 of the first switch module 21-1.

Figure 9:
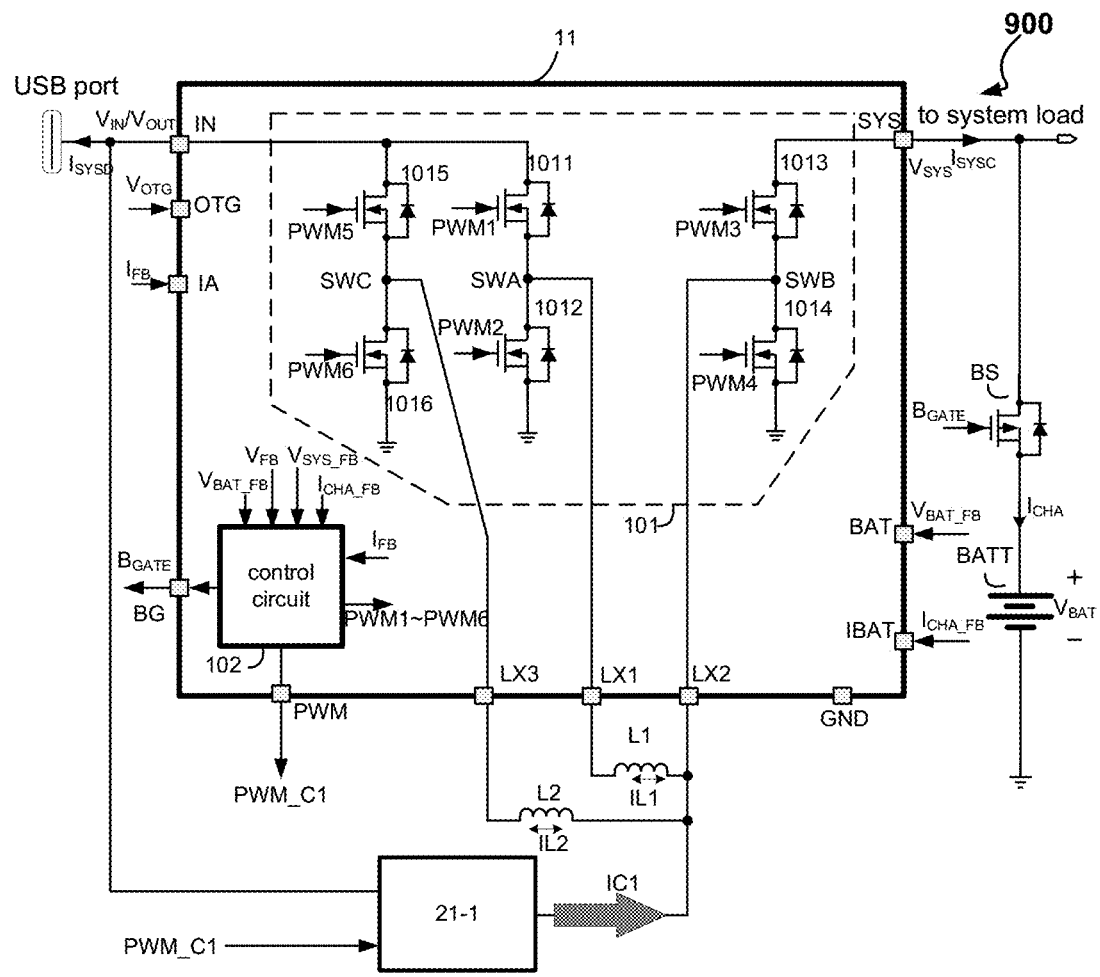
FIG. 9 schematically illustrates a battery current management system 900 in accordance with an embodiment of the present invention.

FIG. 9 schematically illustrates a battery current management system 900 in accordance with an embodiment of the present invention. Compared to the voltage converting circuit 11 of the battery current management system 700 illustrated in FIG. 7, the voltage converting circuit 11 of the battery current management system 900 may further comprise a third inductor pin LX3 as well as the first inductor pin LX1 and the second inductor pin LX2. In the battery current management system 900, both the inductor L1 and the inductor L2 of the voltage converting circuit 11 are arranged external, rather than internal of the voltage converting circuit 11, which is in favour of thermal dissipation of the voltage converting circuit 11. Specifically, the inductor L1 is coupled between the first inductor pin LX1 and the second inductor pin LX2, and the inductor L2 is coupled between the third inductor pin LX3 and the second inductor pin LX2. Meanwhile, in the internal of the voltage converting circuit 11, the common connection SWA is coupled to the first inductor pin LX1, the common connection SWB is coupled to the second inductor pin LX2, and the common connection SWC is coupled to the third inductor pin LX3. In the exemplary embodiment of FIG. 9, the second terminal of the first switch module 21-1 is illustrated to be connected to the second inductor pin LX2, and further coupled to the system pins SYS through the second inductor pin LX2 and the third switch 1013. As can be appreciated, in an alternative embodiment, the second terminal of the first switch module 21-1 can be directly connected to the system pins SYS.

Figure 10:
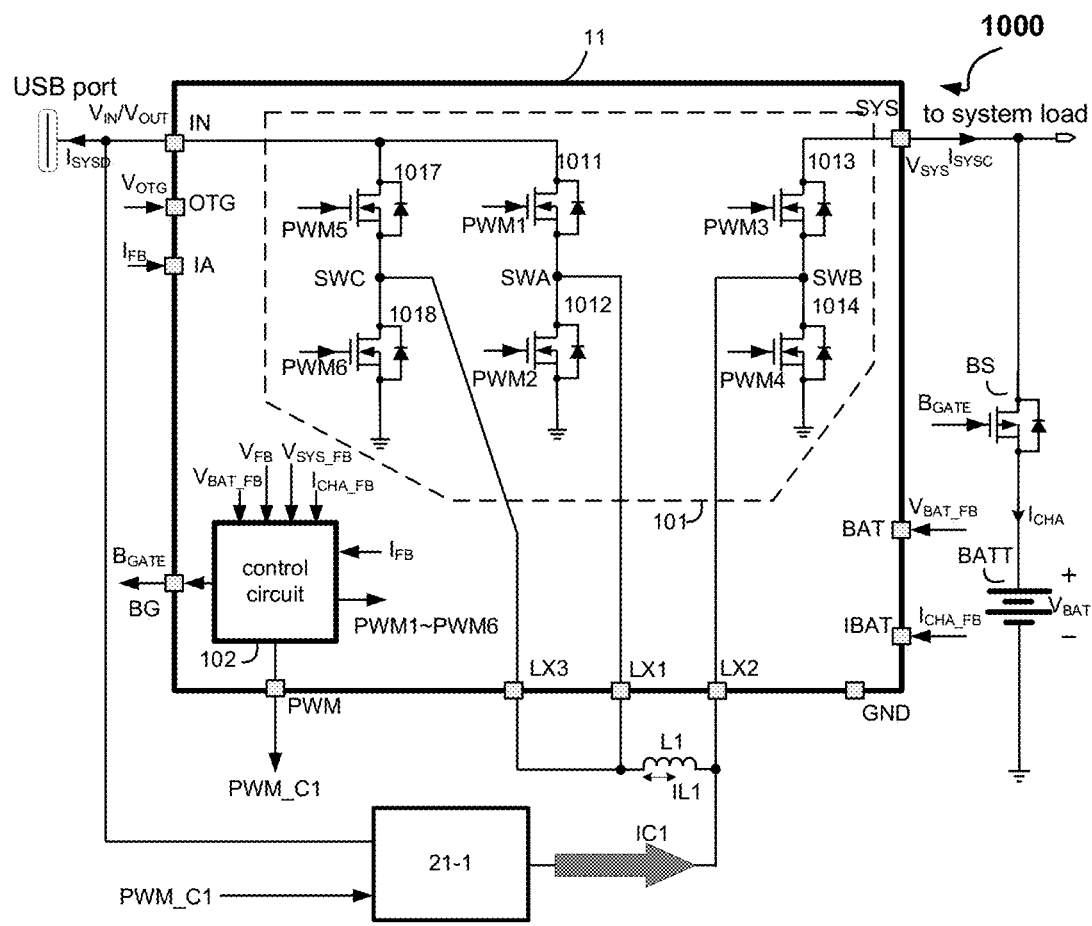
FIG. 10 schematically illustrates a battery current management system 1000 in accordance with an embodiment of the present invention.

FIG. 10 schematically illustrates a battery current management system 1000 in accordance with an embodiment of the present invention. Compared to the battery current management system 900 illustrated in FIG. 9, the battery current management system 1000 may be configured to omit inductor L2 and connect the first inductor pin LX1 and the third inductor pin LX3 together. In such an application, the first switch 1011 and the fifth switch 1015 are connected in parallel while the second switch 1012 and the sixth switch 1016 are connected in parallel. Therefore, on resistance between the port connecting pin IN and the common connection SWA, and on resistance between the port connecting pin IN and the common connection SWA are reduced relative to these of the battery current management system 600, which is further in favour of thermal dissipation of the voltage converting circuit 11.

Figure 11:
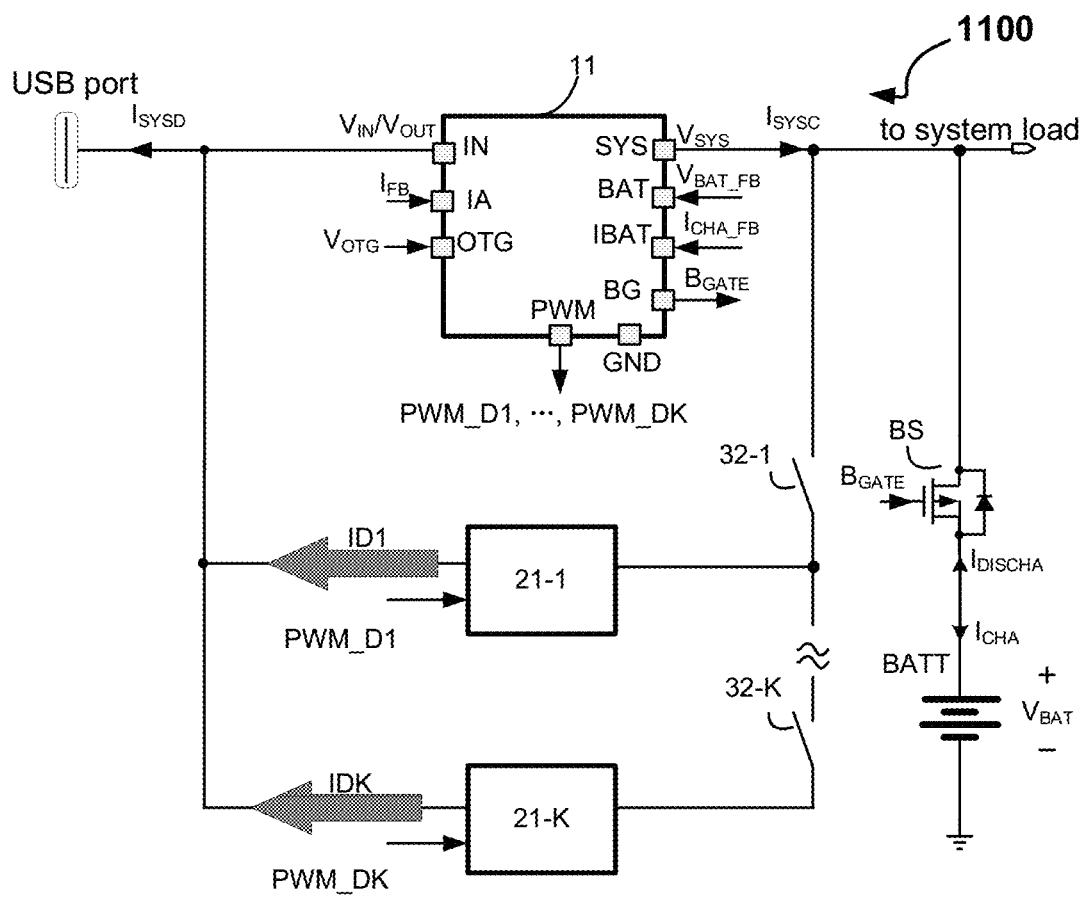
FIG. 11 illustrates a block diagram of a battery current management system 1100 in accordance with an embodiment of the present invention.

FIG. 11 illustrates a block diagram of a battery current management system 1100 in accordance with an embodiment of the present invention. Similarly to the battery current management system 100 illustrated in FIG. 1, the battery current management system 1100 may also comprise the voltage converting circuit 11, K switch modules (21-1, ..., 21-K), the battery switch BS and the battery pack BATT. Meanwhile, the connection relationships of the voltage converting circuit 11, K switch modules (21-1, ..., 21-K), the battery switch BS and the battery pack BATT are the same as these of embodiment has been described above with reference to FIG. 1, and will not be described here in detail again for a purpose of simply. Different from the K switch modules (21-1, ..., 21-K) of the battery current management system 100 illustrated in FIG. 1, the K switch modules (21-1, ..., 21-K) of the battery current management system 1100 may no longer provide the plurality of additional charge current signals (IC1, IC2, ..., ICK) at its second terminal, but provide a plurality of additional discharge current signals (ID1, ID2, ..., IDK) at its first terminal to discharge the battery pack BATT. Meanwhile, the voltage converting circuit 11 is configured to provide a plurality of switch module discharge control signals (PWM_D1, ..., PWM_DK) at the control pin PWM to respectively control each of the K switch modules (21-1, ..., 21-K) on and off.

In the exemplary embodiment of FIG. 11, the battery current management system 1100 may be configured to operate in the regular charge state, the regular discharge state and a fast discharge state. The operations in the regular charge state and the regular discharge state of the battery current management system 1100 are the same as these of the battery current management system 100, and will not be described here in detail again.

When the battery current management system 1100 is configured to operate in the fast discharge state, the voltage converting circuit 11 may be configured to provide the master discharge current signal $I_{SYSD}$ to the USB port while at least one switch module of the K switch modules (21-1, ..., 21-K) is enabled. The enabled switch module may be configured to provide the additional discharge current signal to discharge the battery pack BATT to the USB port.

Similarly to the relevant description of embodiments described in FIG. 1, in an embodiment, for each j=1, ..., K, the switch module charge control signal PWM_Cj is configured to determine whether the corresponding switch module 21-j is enabled or disabled. In other embodiments, some other devices/elements are adopted to enable and disable the plurality of corresponding switch module (21-1, ..., 21-K). For instance, with reference to FIG. 11, the battery current management system 1100 may further comprise a plurality of extra discharge switches (32-1, ..., 32-K) each one of which may be configured to determine whether to enable the corresponding one of the plurality of switch modules (21-1, ..., 21-K). Each one of the plurality of extra discharge switches (32-1, ..., 32-K) is corresponding to one of the plurality of switch modules (21-1, ..., 21-K). As shown in FIG. 11, for each j=1, ..., K, the second terminal of the switch module 21-j may be coupled to the system pin SYS of the voltage converting circuit 11 through the corresponding extra discharge switch 32-j, and the switch module 21-j is enabled when the corresponding extra discharge switch 32-j is turned on. In an embodiment, the plurality of extra discharge switches (32-1, ..., 32-K) may be controlled by external controllers.

For each j=1, ..., K, an average value of the additional discharge current signal IDj is defined as a Root-Mean-Square (RMS) value of the additional discharge current signal IDj in one switching period of the battery current management system 100. Meanwhile, an average value of the master discharge current signal $I_{SYSD}$ is defined as a RMS value of the master discharge current signal $I_{SYSD}$ in one switching period of the battery current management system 1100. In an embodiment, for each j=1, ..., K, the average value of the master discharge current signal $I_{SYSD}$ is integer multiple of the average value of the additional discharge current signal IDj of the switch module 21-j.

Similarly to the embodiment of FIG. 1, the battery current management system 1100 can freely operate in a combination of three operation states according to the actual applications. For example, in an embodiment, the battery current management system 1100 can be configured to only operate in the fast discharge state without any discharge function, the OTG pin of the voltage converting circuit 11 can be omitted. In other embodiments, the battery current management system 1100 can be configured to have two operation states, e.g., the fast discharge state and the regular discharge state.

Figure 12:
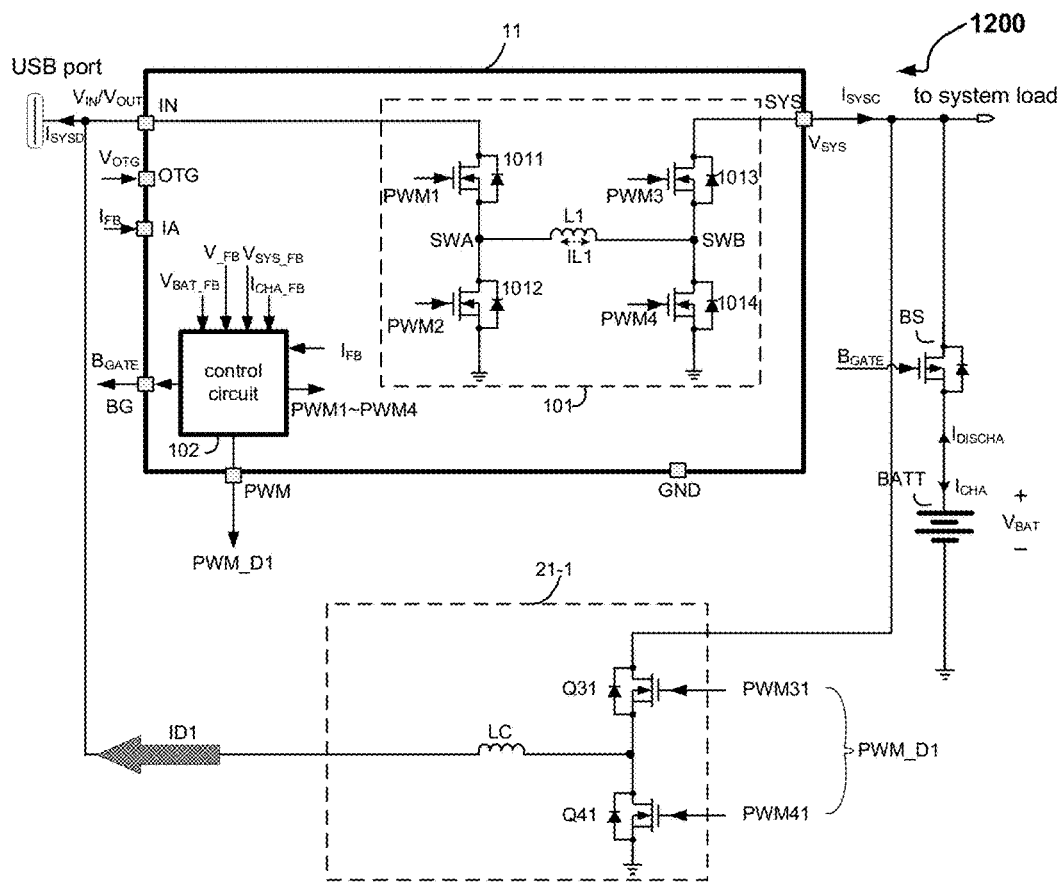
FIG. 12 schematically illustrates a battery current management system 1200 in accordance with an embodiment of the present invention.

FIG. 12 schematically illustrates a battery current management system 1200 in accordance with an embodiment of the present invention. The battery current management system 1200 is a specific embodiment of the battery current management system 1100, and only one switch module 21-1 is chosen for illustration.

Different from the first switch module 21-1 of the battery current management system 200, the first switch module 21-1 of the battery current management system 1200 may comprise the third follower switch Q31, the fourth follower switch Q41 and the follower inductor LC. The third follower switch Q31, the fourth follower switch Q41 are coupled in series between the second terminal of the first switch module 21-1 and the logic ground. The follower inductor LC may be coupled between the first terminal of the first switch module 21-1 and the common connection of the third follower switch Q31 and the fourth follower switch Q41. In an embodiment, inductance of the follower inductor LC is equal to inductance of the inductor L1. The switch module discharge control signal PWM_D1 may comprise the third follower switch control signal PWM31 and the fourth follower switch control signal PWM41. Noted that the extra discharge switch 32-1 of FIG. 11 is omitted in the embodiment of FIG. 12 since enabling the first switch module 21-1 is executed by the third follower switch control signal PWM31 and the fourth follower switch control signal PWM41 rather than controlling the extra discharge switch.

When the battery current management system 1200 is configured to operate in the fast discharge state, the voltage converting circuit 11 may be configured to provide the master discharge current signal $I_{SYSD}$ at its port connecting pin IN while the first switch module 21-1 is enabled to provide the additional discharge current signal ID1 to discharge the battery pack BATT at its first terminal. In an embodiment, when the system voltage signal $V_{SYS}$ is larger than the output voltage signal $V_{OUT}$, the switching circuit 101 of the voltage converting circuit 11 is operated at the step-down mode. When the system voltage signal $V_{SYS}$ is smaller than the output voltage signal $V_{OUT}$, the switching circuit 101 of the voltage converting circuit 11 is operated at the step-up mode. It should be noted that "step-down mode" and "step-up mode" described in the fast discharge state herein are different from these described in the fast charge state mentioned in FIGS. 1-10 since the switching circuit 101 is configured to convert the system voltage signal $V_{SYS}$ to the output voltage signal $V_{OUT}$ in the fast discharge state. During the step-down mode of the battery current management system 1200, the first switch 1011 is turned on and the second switch 1012 is turned off, while the third switch 1013 and the fourth switch 1014 have complementary on and off states. Meanwhile, in an embodiment, the third follower switch control signal PWM31 is synchronized with the third control signal PWM3, i.e., the third follower switch Q31 is synchronized on and off with the third switch 1013. The fourth follower switch control signal PWM41 is synchronized with the fourth control signal PWM4, i.e., the fourth follower switch Q41 is synchronized on and off with the fourth switch 1014. In an alternative embodiment, the third follower switch control signal PWM31 and the third control signal PWM3 have the phase shift of 180°, i.e., the third follower switch Q31 and the third switch 1013 are interleaved to turn on and off. The fourth follower switch control signal PWM41 and the fourth control signal PWM4 have the phase shift of 180°, i.e., the fourth follower switch Q41 and the fourth switch 1014 are interleaved to turn on and off. During the step-up mode of the battery current management system 1200, the third control signal PWM3 controls the first switch 1013 on, the fourth control signal PWM4 controls the fourth switch 1014 off, while the first and the second control signals PWM1 and PWM2 control the first switch 1011 and the second switch 1012 to have complementary on and off states.

As can be appreciated, while only one switch module 21-1 is chosen for illustration in FIG. 12, there may have any suitable quantities of switch modules in different applications. In the battery current management system comprising K switch modules (21-1, . . . , 21-K) which are enabled in the fast discharge state, when the system voltage signal $V_{SYS}$ is larger than the output voltage signal $V_{OUT}$, every two successively neighboring control signals among the third follower switch control signals PWM31 of the plurality of switch modules (21-1, . . . , 21-K) and the third control signal PWM3 may be synchronized or have the predetermined identical phase shift of 360°/(K+1) in sequence. Meanwhile, every two successively neighboring control signals among the fourth follower switch control signals PWM41 of the plurality of switch modules (21-1, . . . , 21-K) and the fourth control signal PWM4 may be synchronized or have the predetermined identical phase shift of 360°/(K+1) in sequence.

Figure 13:
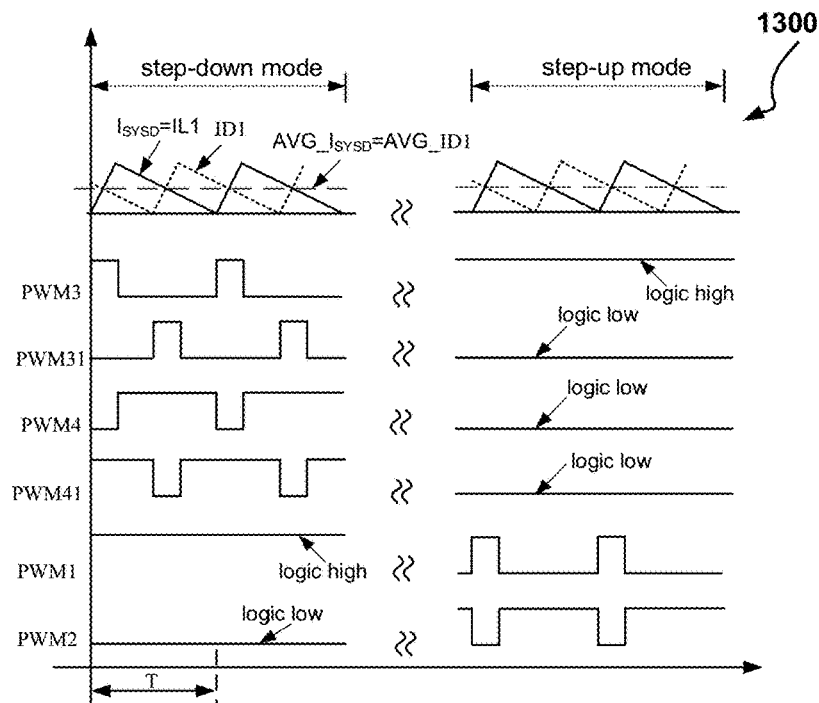
FIG. 13 illustrates an operation waveform diagram 1300 illustrating operation of the battery current management system 1200 in accordance with an embodiment of the present invention.

FIG. 13 illustrates an operation waveform diagram 1300 illustrating operation of the battery current management system 1200 in accordance with an embodiment of the present invention. As shown in FIG. 13, the waveforms diagram 1300 illustrates the inductor current signal IL1, the additional discharge current signal ID1, the third control signal PWM3, the third follower switch control signals PWM31, the fourth control signal PWM4, the fourth follower switch control signals PWM41, the first control signal PWM1 and the second control signal PWM2 from top to bottom.

As shown in FIG. 13, during the step-down mode, the third and the fourth control signals PWM3 and PWM4 have complementary logic states, the first control signal PWM1 is logic high (the third switch 1013 is on), and the second control signal PWM2 is logic low (the fourth switch 1014 is off). At the same time, the third follower switch control signal PWM31 logs behind the third control signal PWM1 with the phase of 180°, and the fourth follower switch control signal PWM41 logs behind the fourth control signal PWM4 with the phase of 180°.

During the step-up mode, the first and the second control signals PWM1 and PWM2 have complementary logic states, the third control signal PWM3 is logic high (the third switch 1013 is on), and the fourth control signal PWM4 is logic low (the fourth switch 1014 is off). At the same time, both the third follower switch control signal PWM31 and the fourth follower switch control signal PWM41 are logic low so that the first switch module 21-1 is disabled. As can also be known from the operation waveform diagram 1300, the average value AVG_$I_{SYSC}$ of the master discharge current signal $I_{SYSD}$ is equal to the average value AVG_ID1 of the additional discharge current signal ID1 of the first switch module 21-1.

Figure 14:
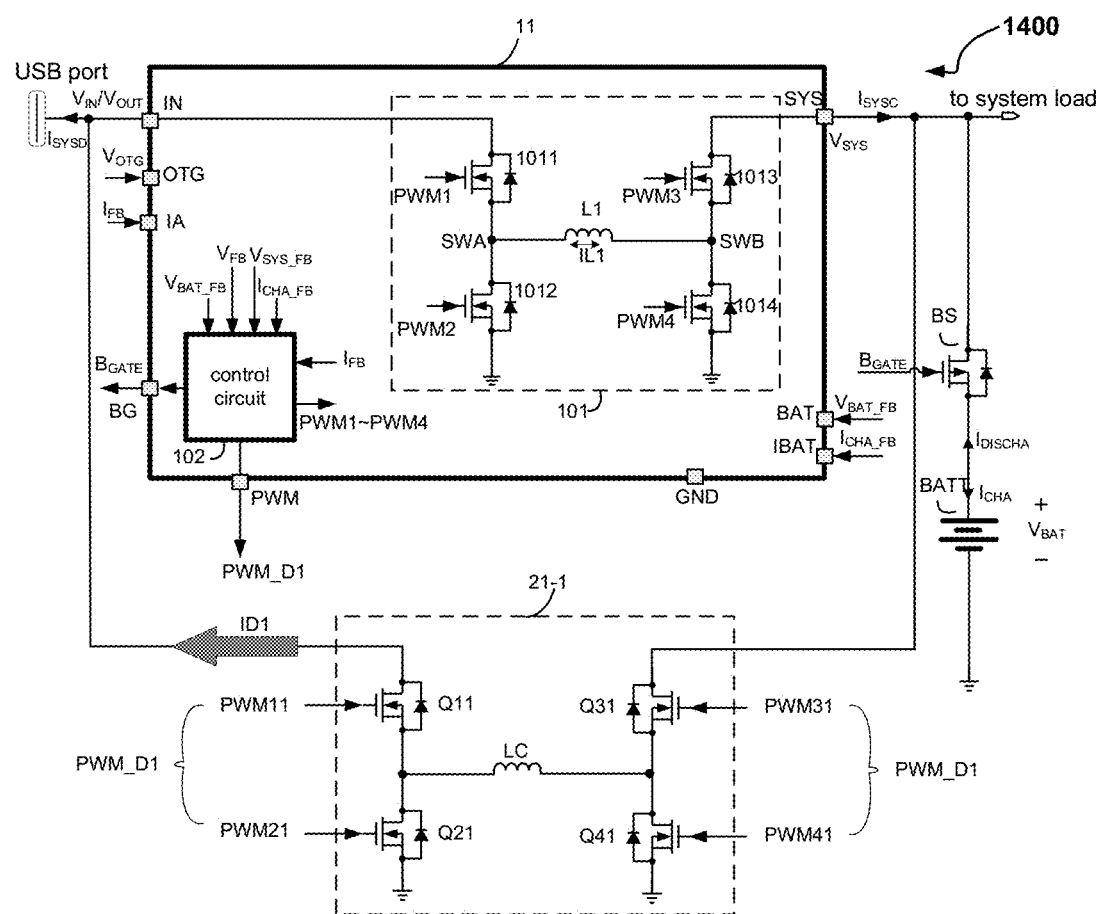
FIG. 14 schematically illustrates a battery current management system 1400 in accordance with an embodiment of the present invention.

FIG. 14 schematically illustrates a battery current management system 1400 in accordance with an embodiment of the present invention. Compared with the first switch module 21-1 of the battery current management system 1200 of FIG. 12, the first switch module 21-1 of the battery current management system 1400 may be illustrated to have a different topology which is disclosed in FIG. 4. In the embodiment of FIG. 14, the switch module discharge control signal PWM_D1 may comprise the first follower switch control signal PWM11, the second follower switch control signal PWM21, the third follower switch control signal PWM31, and the fourth follower switch control signal PWM41.

When the battery current management system 1400 is configured to operate in the regular charge state, the voltage converting circuit 11 may be configured to provide the master charge current signal $I_{SYSC}$ at its system pin SYS while keep the first switch module 21-1 disabled.

When the battery current management system 1400 is configured to operate in the regular discharge state, the voltage converting circuit 11 may be configured to provide the master discharge current signal $I_{SYSD}$ at its port connecting pin IN while keep the first switch module 21-1 disabled.

When the battery current management system 1400 is configured to operate in the fast discharge state, the voltage converting circuit 11 may be configured to provide the master discharge current signal $I_{SYSD}$ at its port connecting pin IN while the first switch module 21-1 is enabled to provide the additional discharge current signal ID1 at its first terminal. In an embodiment, when the system voltage signal $V_{SYS}$ is larger than the output voltage signal $V_{OUT}$, the first follower switch Q11 is turned on and the second follower switch Q21 is turned off. Meanwhile, the third follower switch Q31 is synchronized or interleaved on and off with the second switch 1013, and the fourth follower switch Q41 is synchronized or interleaved on and off with the second switch 1014. When the system voltage signal $V_{SYS}$ is smaller than the output voltage signal $V_{OUT}$, the third follower switch Q31 is turned on and the fourth follower switch Q41 is turned off. Meanwhile, the first follower switch Q11 is synchronized or interleaved on and off with the first switch 1011. The second follower switch Q21 is synchronized or interleaved on and off with the second switch 1012.

As can be appreciated, while only one switch module 21-1 is chosen for illustration in FIG. 14, there may have any suitable quantities of switch modules in different applications. For instance, in a battery current management system comprising K switch modules (21-1, . . . , 21-K), if all of the K switch modules (21-1, . . . , 21-K) are enabled and the system voltage signal $V_{SYS}$ is larger than the output voltage signal $V_{OUT}$, every two successively neighboring control signals among the third follower switch control signals PWM31 of the plurality of switch modules (21-1, . . . , 21-K) and the third control signal PWM3 may be synchronized or have the predetermined identical phase shift of 360°/(K+1) in sequence. Meanwhile, every two successively neighboring control signals among the fourth follower switch control signals PWM41 of the plurality of switch modules (21-1, . . . , 21-K) and the fourth control signal PWM4 may be synchronized or have the predetermined identical phase shift of 360°/(K+1) in sequence. The first follower switch control signals PWM11 of the plurality of switch modules (21-1, . . . , 21-K) and the first control signal PWM1 may be synchronized. The second follower switch control signals PWM21 of the plurality of switch modules (21-1, . . . , 21-K) and the second control signal PWM2 may be synchronized. If all of the K switch modules (21-1, . . . , 21-K) are enabled and the system voltage signal $V_{SYS}$ is smaller than the output voltage signal $V_{OUT}$, every two successively neighboring control signals among the first follower switch control signals PWM11 of the plurality of switch modules (21-1, . . . , 21-K) and the first control signal PWM1 may be synchronized or have the predetermined identical phase shift of 360°/(K+1) in sequence. Meanwhile, every two successively neighboring control signals among the second follower switch control signals PWM21 of the plurality of switch modules (21-1, . . . , 21-K) and the second control signal PWM2 may be synchronized or have the predetermined identical phase shift of 360°/(K+1) in sequence. The third follower switch control signals PWM31 of the plurality of switch modules (21-1, . . . , 21-K) and the third control signal PWM3 may be synchronized. The fourth follower switch control signals PWM41 of the plurality of switch modules (21-1, . . . , 21-K) and the fourth control signal PWM4 may be synchronized.

In the exemplary embodiment of FIG. 14, the voltage converting circuit 11 is configured to control the first switch module 21-1 to provide the additional discharge current signal ID1 through controlling the first follower switch Q11, the second follower switch Q21, the third follower switch Q31 and the fourth follower switch Q41 to perform on and off switching.

Figure 15:
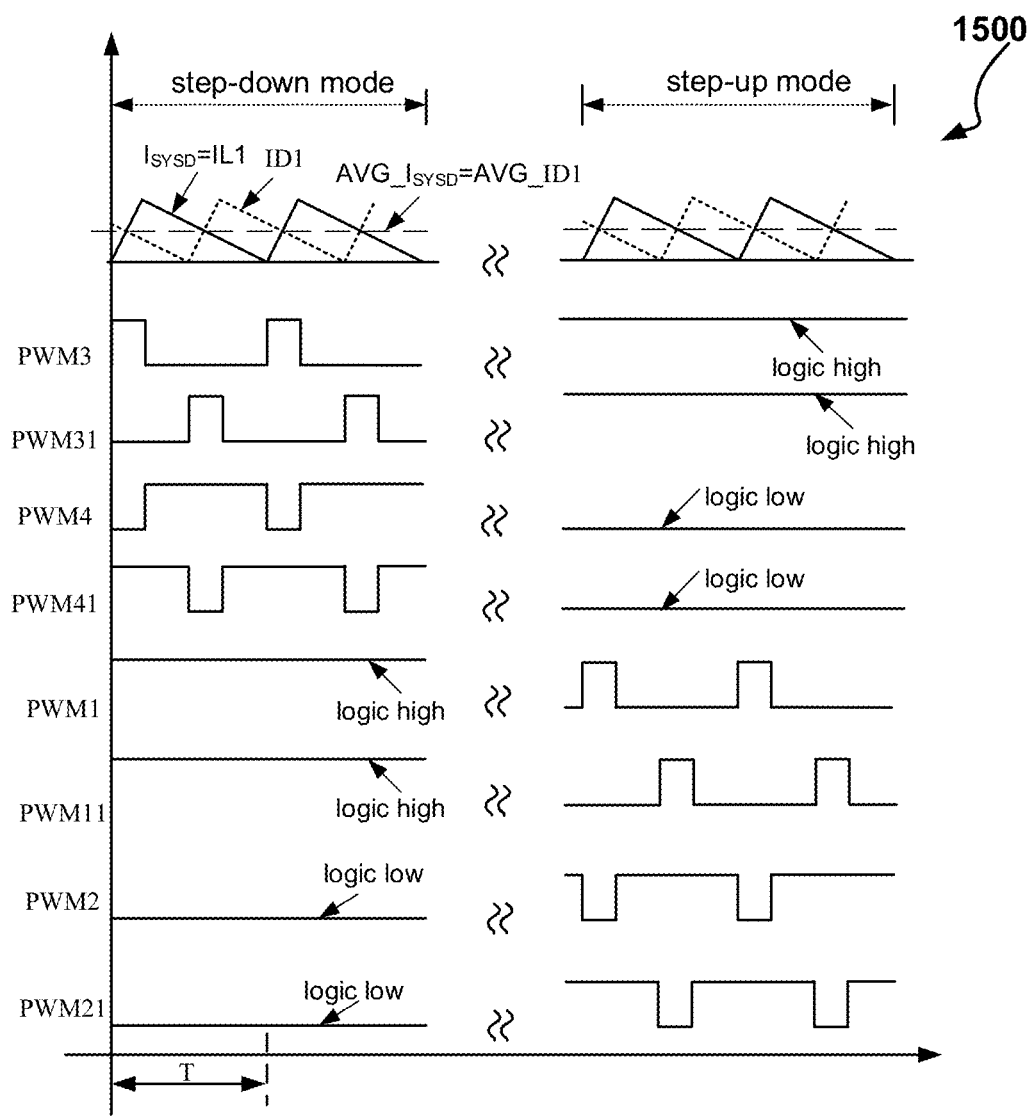
FIG. 15 illustrates an operation waveform diagram 1500 illustrating operation of the battery current management system 1400 in accordance with an embodiment of the present invention.

FIG. 15 illustrates an operation waveform diagram 1500 illustrating operation of the battery current management system 1400 in accordance with an embodiment of the present invention. As shown in FIG. 15, the waveforms diagram 1500 illustrates the inductor current signal IL1, the additional discharge current signal ID1, the third control signal PWM3, the third follower switch control signal PWM31, the fourth control signal PWM4, the fourth follower switch control signal PWM41, the first control signal PWM1, the first follower switch control signal PWM11, the second control signal PWM2, and the second follower switch control signal PWM21 from top to bottom.

As shown in FIG. 15, during the step-down mode, the third and the fourth control signals PWM3 and PWM4 have complementary logic states, the first control signal PWM1 is logic high, and the second control signal PWM2 is logic low. The third follower switch control signal PWM31 logs behind the third control signal PWM3 with the phase of 180°, the fourth follower switch control signal PWM41 logs behind the fourth control signal PWM4 with the phase of 180°. Meanwhile, the first follower switch control signal PWM11 is logic high, and the second follower switch control signal PWM21 is logic low.

During this step-up mode, the first and the second control signals PWM1 and PWM2 have complementary logic states, the third control signal PWM3 is logic high, and the fourth control signal PWM4 is logic low. The first follower switch control signal PWM11 logs behind the first control signal PWM1 with the phase of 180°, the second follower switch control signal PWM21 logs behind the second control signal PWM2 with the phase of 180°. Meanwhile, the third follower switch control signal PWM31 is logic high, and the fourth follower switch control signal PWM41 is logic low.

Figure 16:
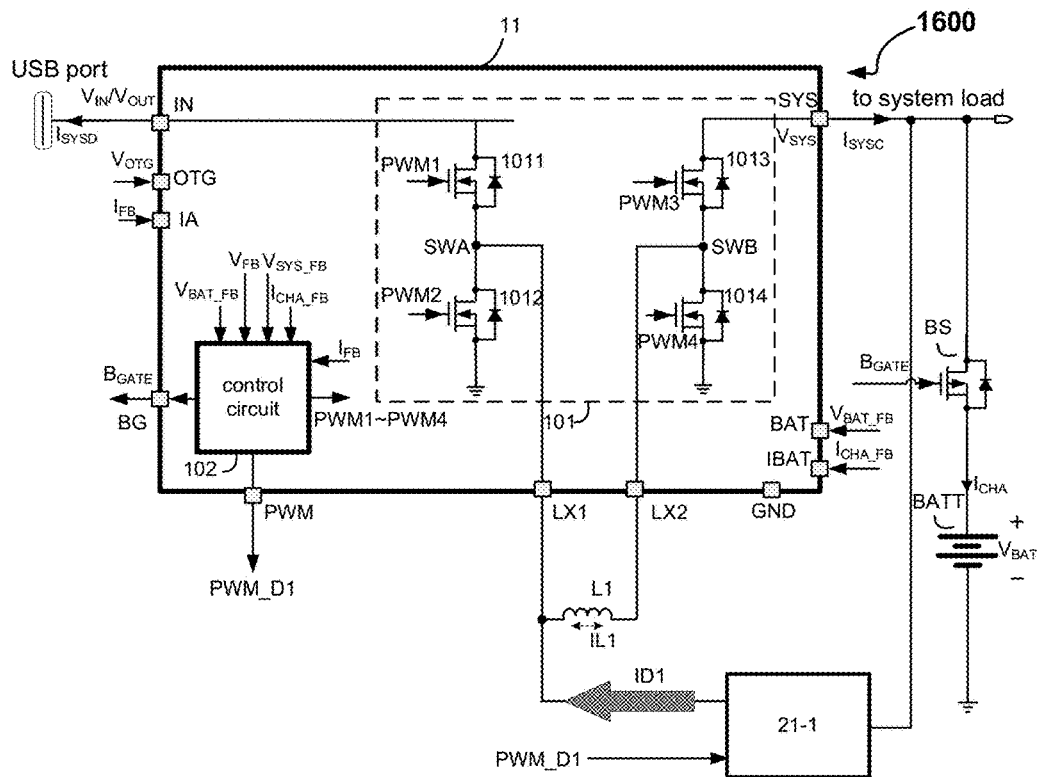
FIG. 16 schematically illustrates a battery current management system 1600 in accordance with an embodiment of the present invention.

FIG. 16 schematically illustrates a battery current management system 1600 in accordance with an embodiment of the present invention. Compared to the voltage converting circuit 11 of the battery current management systems 1200 and 1400, the voltage converting circuit 11 of the battery current management system 1600 may further comprise the first inductor pin LX1 and the second inductor pin LX2. In the battery current management system 1600, the inductor L1 of the voltage converting circuit 11 is arranged to be connected external of the voltage converting circuit 11 between the first inductor pin LX1 and the second inductor pin LX2, rather than internal of the voltage converting circuit 11. In the battery current management system 1600, arranging the inductor L1 external of the voltage converting circuit 11 is in favour of thermal dissipation of the voltage converting circuit 11. In the exemplary embodiment of FIG. 16, the first terminal of the first switch module 21-1 is illustrated to be connected to the first inductor pin LX1, and further coupled to the port connecting pin IN through the first inductor pin LX1 and the first switch 1011. As can be appreciated, in an alternative embodiment, the first terminal of the first switch module 21-1 can be directly connected to the port connecting pin IN.

Figure 17:
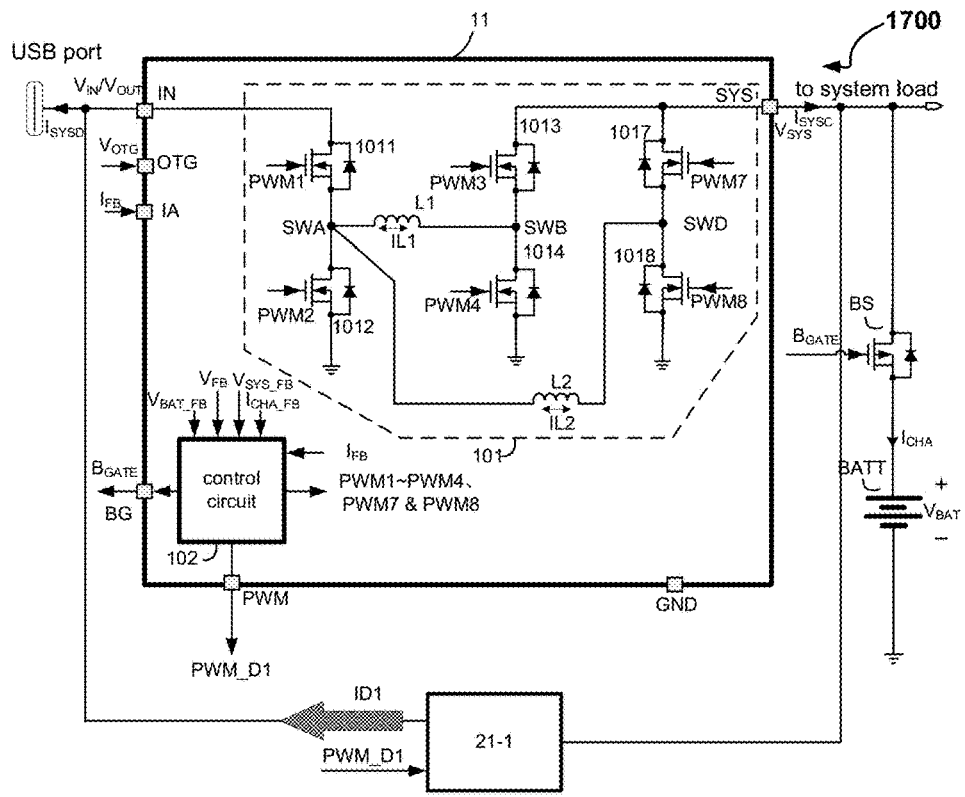
FIG. 17 schematically illustrates a battery current management system 1700 in accordance with an embodiment of the present invention.

FIG. 17 schematically illustrates a battery current management system 1700 in accordance with an embodiment of the present invention. Compared to the switching circuits 101 of the battery current management systems 1200, 1400 and 1600, the switching circuit 101 of the battery current management system 1700 may be illustrated to have a different topology. Specifically, the switching circuit 101 of the battery current management system 1700 may further comprise a seventh switch 1017, an eighth switch 1018, and the inductor L2 as well as the first switch 1011, the second switch 1012, the third switch 1013, the fourth switch 1014 and the inductor L1. The first switch 1011 and the second switch 1012 are connected between the port connecting pin IN and the logic ground. The third switch 1013 and the fourth switch 1014 are connected in serial between the system pin SYS and the logic ground. The seventh switch 1017 and the eighth switch 1018 are connected in serial between the system pin SYS and the logic ground. The common connection of the first switch 1011 and the second switch 1012 is labeled as SWA, the common connection of the third switch 1013 and the fourth switch 1014 is labeled as SWB, and a common connection of the seventh switch 1017 and the eighth switch 1018 is labeled as SWD. The inductor L1 is connected between the common connection SWA and the common connection SWB, and the inductor L2 is connected between the common connection SWA and the common connection SWD.

The control circuit 102 of FIG. 17 is configured to receive the voltage feedback signal $V_{FB}$, the current feedback signal $I_{FB}$, the system voltage feedback signal $V_{SYS\_FB}$, the battery voltage feedback signal $V_{BAT\_FB}$ and the battery current feedback signal $I_{CHA\_FB}$, and further configured to generate control signals PWM1-PWM4, PWM7-PWM8, the switch module charge control signal PWM_C1 and the driving signal $B_{GATE}$. The control signals PWM7-PWM8 are configured to respectively control the seventh switch 1017 and the eighth switch 1018 to perform on and off switching.

The topology of the first switch module 21-1 of FIG. 17 can be the same as either the topology of the first switch module 21-1 shown in FIG. 12 or the topology of the first switch module 21-1 in FIG. 14. Next, the operating principle of the battery current management system 1700 will be introduced in a hypothesis the topology of the first switch module 21-1 of FIG. 12 is adopted, i.e., the first switch module 21-1 only comprises the third follower switch Q31, the fourth follower switch Q41 and the follower inductor LC.

When the battery current management system 1700 is configured to operate in the fast discharge state, the voltage converting circuit 11 may be configured to provide the master discharge current signal $I_{SYSD}$ at its port connecting pin IN while the first switch module 21-1 is enabled to provide the additional discharge current signal ID1. In an embodiment, when the system voltage signal $V_{SYS}$ is larger than the output voltage signal $V_{OUT}$, the switch 1011 is on and the second switch 1012 is off, the third switch 1013 and the fourth switch 1014 have complementary on and off state, and the seventh switch 1017 and the eighth switch 1018 have complementary on and off states. Meanwhile, the third control signal PWM3, the seventh control signal PWM7 and the third follower switch control signal PWM31 are synchronized or have the predetermined identical phase shift of 120° in sequence. The fourth control signal PWM4, the eighth control signal PWM8 and the fourth follower switch control signal PWM41 are synchronized or have the predetermined identical phase shift of 120° in sequence.

As can also be appreciated, while only one switch module 21-1 is chosen for illustration in FIG. 17, there may have any suitable quantities of switch modules in different applications. In the battery current management system comprising K switch modules (21-1, ..., 21-K) which are enabled in the fast discharge state, when the system voltage signal $V_{SYS}$ is larger than the output voltage signal $V_{OUT}$, the third control signal PWM3, the seventh control signal PWM7 and every two successively neighboring control signals among the third follower switch control signal PWM31 of the plurality of switch modules (21-1, ..., 21-K) may have the predetermined identical phase shift of 360°/(K+2) in sequence. Meanwhile, the fourth control signal PWM4, the eighth control signal PWM8 and every two successively neighboring control signals among the fourth follower switch control signal PWM41 of the plurality of switch modules (21-1, ..., 21-K) may have the predetermined identical phase shift of 360°/(K+2) in sequence.

In the exemplary embodiment of FIG. 17, the voltage converting circuit 11 may be configured to provide the master discharge current signal $I_{SYSD}$ which is the sum of inductor current signal IL1 and the inductor current signal IL2. The first switch module 21-1 may be configured to provide the additional discharge current signal ID1 at its first terminal. In the exemplary embodiment of FIG. 17, the average value of the master discharge current signal $I_{SYSD}$ is twice of the average value of the additional discharge current signal ID1 of the first switch module 21-1.

Figure 18:
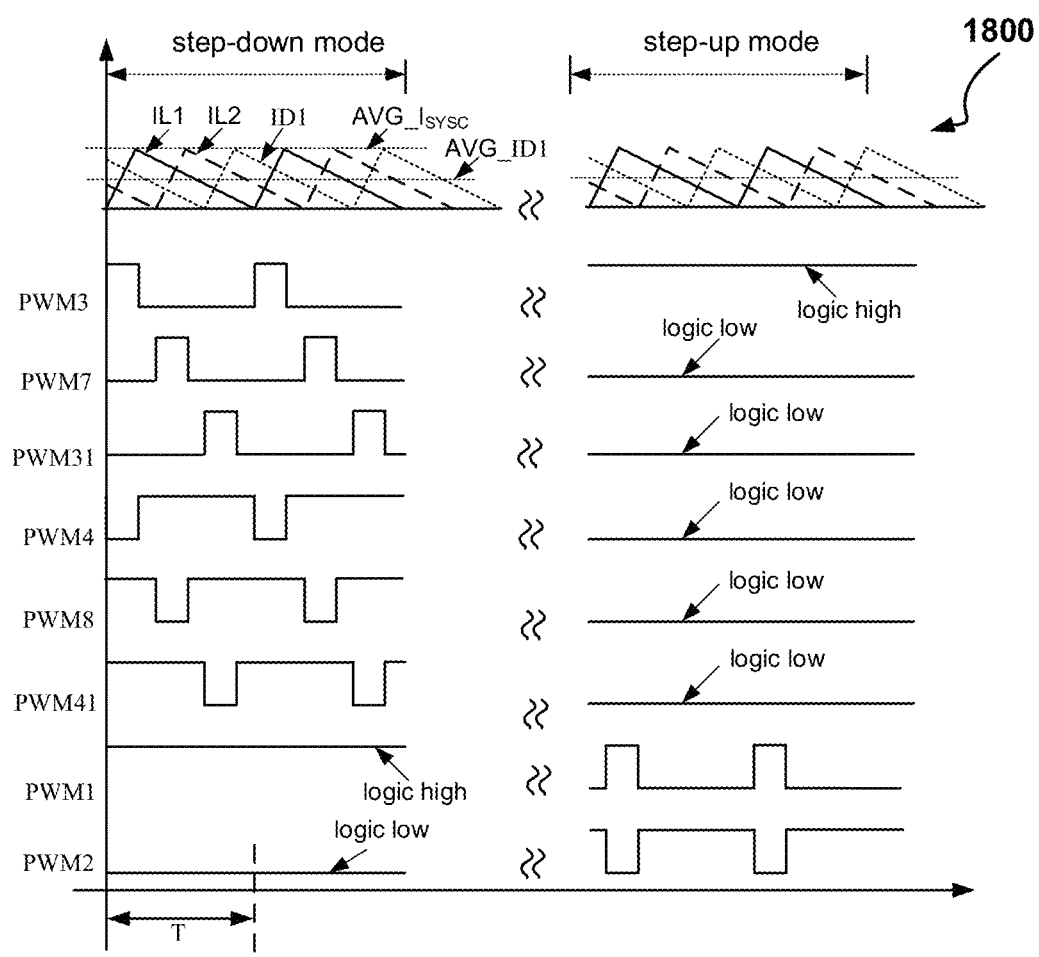
FIG. 18 illustrates an operation waveform diagram 1800 illustrating operation of the battery current management system 1700 in accordance with an embodiment of the present invention.

FIG. 18 illustrates an operation waveform diagram 1800 illustrating operation of the battery current management system 1700 in accordance with an embodiment of the present invention. As shown in FIG. 18, the waveforms diagram 1800 illustrates the inductor current signal IL1, the inductor current signal IL2, the additional discharge current signal ID1, the third control signal PWM3, the seventh control signal PWM7, the third follower switch control signal PWM31, the fourth control signal PWM4, the eighth control signal PWM8, the fourth follower switch control signal PWM41, the first control signal PWM1, and the second control signal PWM2 from top to bottom.

As shown in FIG. 18, during the step-down mode, the third and the fourth control signals PWM3 and PWM4 have complementary logic states, the seventh and the eighth control signals PWM7 and PWM8 have complementary logic states, the first control signal PWM1 is logic high, and the second control signal PWM2 is logic low. The seventh control signal PWM7 logs behind the third control signal PWM3 with the phase of 120°, the third follower switch control signal PWM31 logs behind the seventh control signal PWM7 with the phase of 120°, the eighth control signal PWM8 logs behind the fourth control signal PWM4 with the phase of 120°, and the fourth follower switch control signal PWM41 logs behind the eighth control signal PWM8 with the phase of 120°.

During this step-up mode, the first and the second control signals PWM1 and PWM2 have complementary logic states, the third control signal PWM3 is logic high, and the fourth control signal PWM4 is logic low. At the same time, the third follower switch control signal PWM31, the fourth follower switch control signal PWM41, the seventh control signal PWM7 and the eighth control signal PWM8 are logic low. As can also be known from the operation waveform diagram 1800, the average value $AVG\_I_{SYSD}$ of the master discharge current signal $I_{SYSD}$ is twice of the average value AVG_ID1 of the additional discharge current signal ID1 of the first switch module 21-1.

Figure 19:
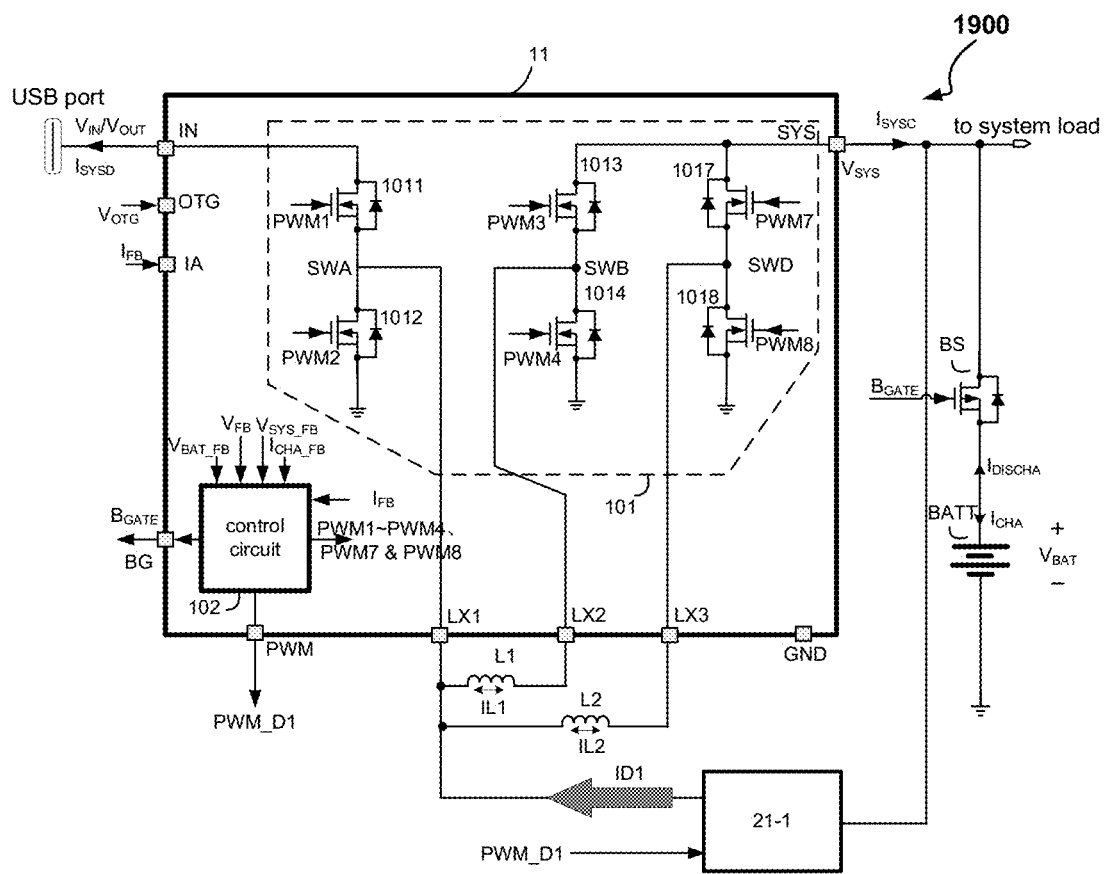
FIG. 19 schematically illustrates a battery current management system 1900 in accordance with an embodiment of the present invention.

FIG. 19 schematically illustrates a battery current management system 1900 in accordance with an embodiment of the present invention. Compared to the voltage converting circuit 11 of the battery current management system 1700 illustrated in FIG. 17, the voltage converting circuit 11 of the battery current management system 1900 may further comprise the third inductor pin LX3 as well as the first inductor pin LX1 and the second inductor pin LX2. In the battery current management system 1900, both the inductor L1 and the inductor L2 of the voltage converting circuit 11 are arranged external, rather than internal of the voltage converting circuit 11, which is in favour of thermal dissipation of the voltage converting circuit 11. Specifically, the inductor L1 is coupled between the first inductor pin LX1 and the second inductor pin LX2, and the inductor L2 is coupled between the first inductor pin LX1 and the third inductor pin LX3. Meanwhile, in the internal of the voltage converting circuit 11, the common connection SWA is coupled to the first inductor pin LX1, the common connection SWB is coupled to the second inductor pin LX2, and the common connection SWD is coupled to the third inductor pin LX3. In the exemplary embodiment of FIG. 19, the first terminal of the first switch module 21-1 is illustrated to be connected to the first inductor pin LX1, and further coupled to the port connecting pin IN through the first inductor pin LX1 and the first switch 1011. As can be appreciated, in an alternative embodiment, the first terminal of the first switch module 21-1 can be directly connected to the port connecting pin IN.

Figure 20:
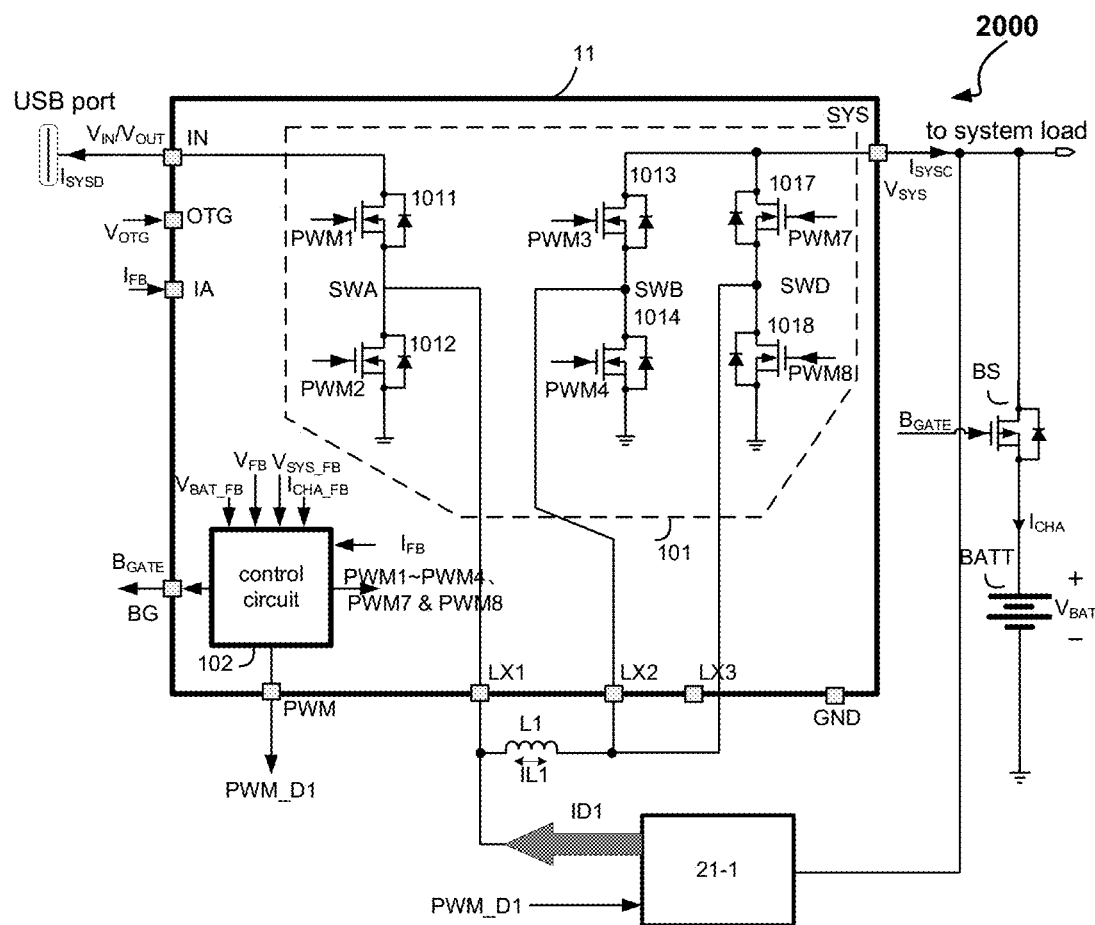
FIG. 20 schematically illustrates a battery current management system 2000 in accordance with an embodiment of the present invention.

FIG. 20 schematically illustrates a battery current management system 2000 in accordance with an embodiment of the present invention. Compared to the battery current management system 1900 illustrated in FIG. 19, the battery current management system 2000 may be configured to omit the inductor L2 and connect the second inductor pin LX2 and the third inductor pin LX3 together. In such an application, the third switch 1013 and the seventh switch 1017 are connected in parallel while the fourth switch 1014 and the eighth switch 1018 are connected in parallel. Therefore, on resistance between the system pin SYS and the common connection SWB, and on resistance between the system pin SYS and the common connection SWD are reduced relative to these of the battery current management system 1600, which is further in favour of thermal dissipation of the voltage converting circuit 11.

Figure 21:
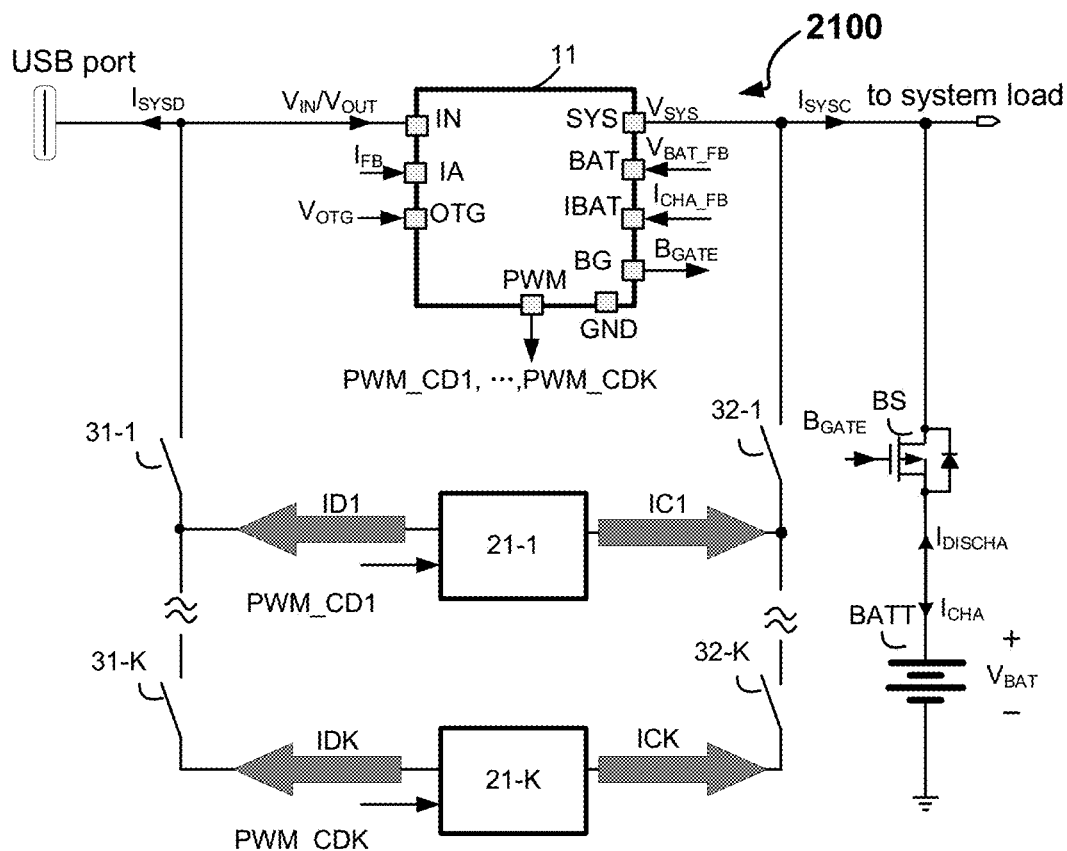
FIG. 21 illustrates a block diagram of a battery current management system 2100 in accordance with an embodiment of the present invention.

FIG. 21 illustrates a block diagram of a battery current management system 2100 in accordance with an embodiment of the present invention. Similarly to the battery current management systems 100 and 1100, the battery current management system 2100 may also comprise the voltage converting circuit 11, K switch modules (21-1, . . . , 21-K), the battery switch BS and the battery pack BATT. Meanwhile, the connection relationships of the voltage converting circuit 11, K switch modules (21-1, . . . , 21-K), the battery switch BS and the battery pack BATT are the same as these of embodiment has been described above with reference to FIG. 1, and will not be described here in detail again for a purpose of simply. Different from the K switch modules (21-1, . . . , 21-K) of the battery current management systems 100 and 1100, the K switch modules (21-1, . . . , 21-K) of the battery current management system 2100 may both provide the plurality of additional charge current signals (IC1, IC2, . . . , ICK) at its second terminal and the plurality of additional discharge current signals (ID1, ID2, . . . , IDK) at its first terminal to discharge the battery pack BATT. Besides, the voltage converting circuit 11 is configured to provide a plurality of switch module charge and discharge control signals (PWM_CD1, . . . , PWM_CDK) at the control pin PWM to respectively control each of the K switch modules (21-1, . . . , 21-K) on and off.

In the exemplary embodiment of FIG. 21, the battery current management system 2100 may be configured to operate in the regular charge state, the regular discharge state, the fast charge state and the fast discharge state. The operations in the regular charge state and the regular discharge state of the battery current management system 2100 are the same as these of the battery current management systems 100 and 1100, the operation in the fast charge state of the battery current management system 2100 is the same as that of the battery current management systems 100, and the operation in the fast discharge state of the battery current management system 2100 is the same as that of the battery current management systems 1100, here will not describe in detail again for a purpose of simply.

In an embodiment, for each j=1, . . . , K, the switch module charge control signal PWM_Cj is configured to determine whether the corresponding switch module 21-j is enabled or disabled. The control principle is similar to the relevant description of embodiments with reference to FIG. 1 and FIG. 11. In other embodiments, some other devices/elements are adopted to enable and disable the plurality of corresponding switch module (21-1, . . . , 21-K). For instance, with reference to FIG. 21, the battery current management system 2100 may further comprise the plurality of extra charge switches (31-1, . . . , 31-K) and the plurality of extra discharge switches (32-1, . . . , 32-K) adopted to enable and disable the plurality of corresponding switch module (21-1, . . . , 21-K).

Similarly to the embodiments of FIG. 1 and FIG. 11, the battery current management system 2100 can freely operate in a combination of these four operation states according to the actual applications.

Figure 22:
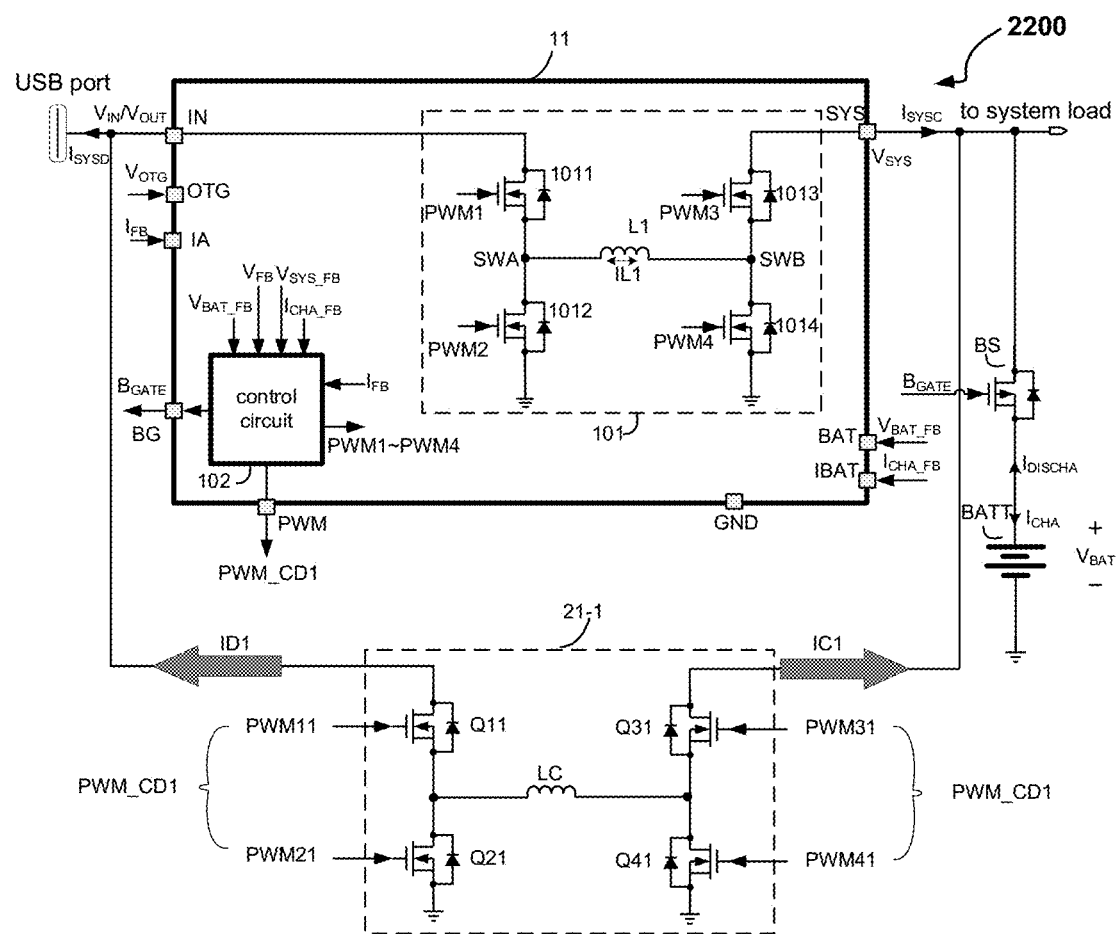
FIG. 22 schematically illustrates a battery current management system 2200 in accordance with an embodiment of the present invention.

FIG. 22 schematically illustrates a battery current management system 2200 in accordance with an embodiment of the present invention. The battery current management system 2200 is a specific embodiment of the battery current management system 2100, and only one switch module 21-1 is chosen for illustration. Schematic diagram of the battery current management system 2200 is the same as these of battery current management systems 400 and 1400, except that the first switch module 21-1 of the battery current management system 2200 may both provide the additional charge current sign IC1 at its second terminal and the additional discharge current signal ID1 at its first terminal.

In the exemplary embodiment of FIG. 22, the battery current management system 2200 may be configured to operate in the regular charge state, the regular discharge state, the fast charge state and the fast discharge state. The operations in the regular charge state, the regular discharge state and the fast charge state of the battery current management system 2200 are the same as that of the battery current management systems 400. The operations in the regular charge state, the regular discharge state and the fast discharge state of the battery current management system 2200 are the same as that of the battery current management systems 1400.

As can be appreciated, the voltage converting circuit 11 of the battery current management system 2200 can also comprise the first inductor pin LX1 and the second inductor pin LX2 both of which serve to arrange the inductor L1 external of the voltage converting circuit 11 for thermal dissipation.

Figure 23:
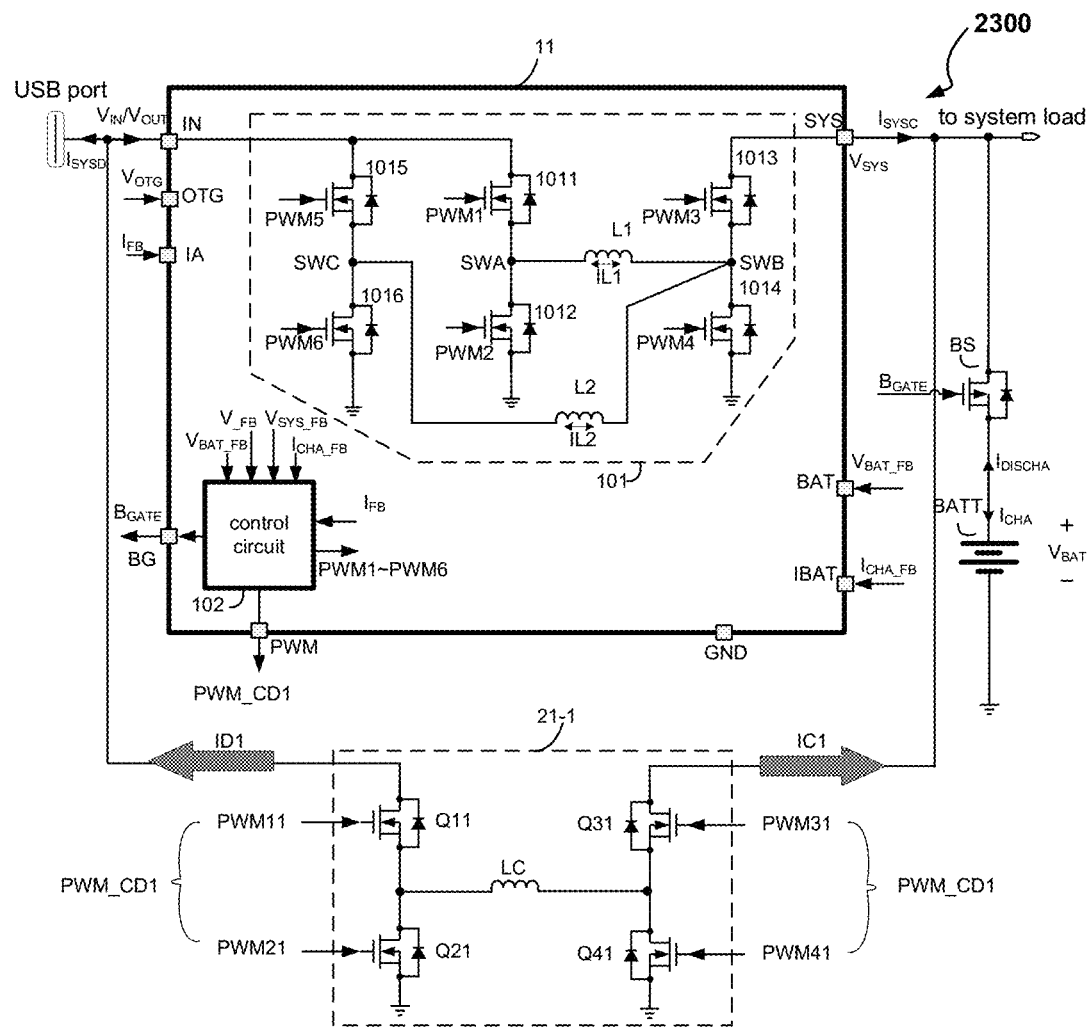
FIG. 23 schematically illustrates a battery current management system 2300 in accordance with an embodiment of the present invention.

FIG. 23 schematically illustrates a battery current management system 2300 in accordance with an embodiment of the present invention. The operations in the regular charge state, the regular discharge state, the fast charge state of the battery current management system 2300 are the same as these of the battery current management systems 700, here will not describe in detail again for a purpose of simply. In an embodiment, when the battery current management system 2300 is configured to operate in the fast discharge state and the system voltage signal $V_{SYS}$ is larger than the output voltage signal $V_{OUT}$, one or both of the first switch 1011 and the fifth switch 1015 are turned on, the second switch 1012 and the first switch 1011 are complementary on and off, the sixth switch 1016 and the fifth switch 1015 are complementary on and off, and the third switch 1013 and the fourth switch 1014 are complementary on and off. Meanwhile, the first follower switch Q11 is turned on, the second follower switch Q21 is turned off, the third follower switch Q31 is synchronized or interleaved on and off with the third switch 1013, and the fourth follower switch Q41 is synchronized or interleaved on and off with the fourth switch 1014.

Figure 24:
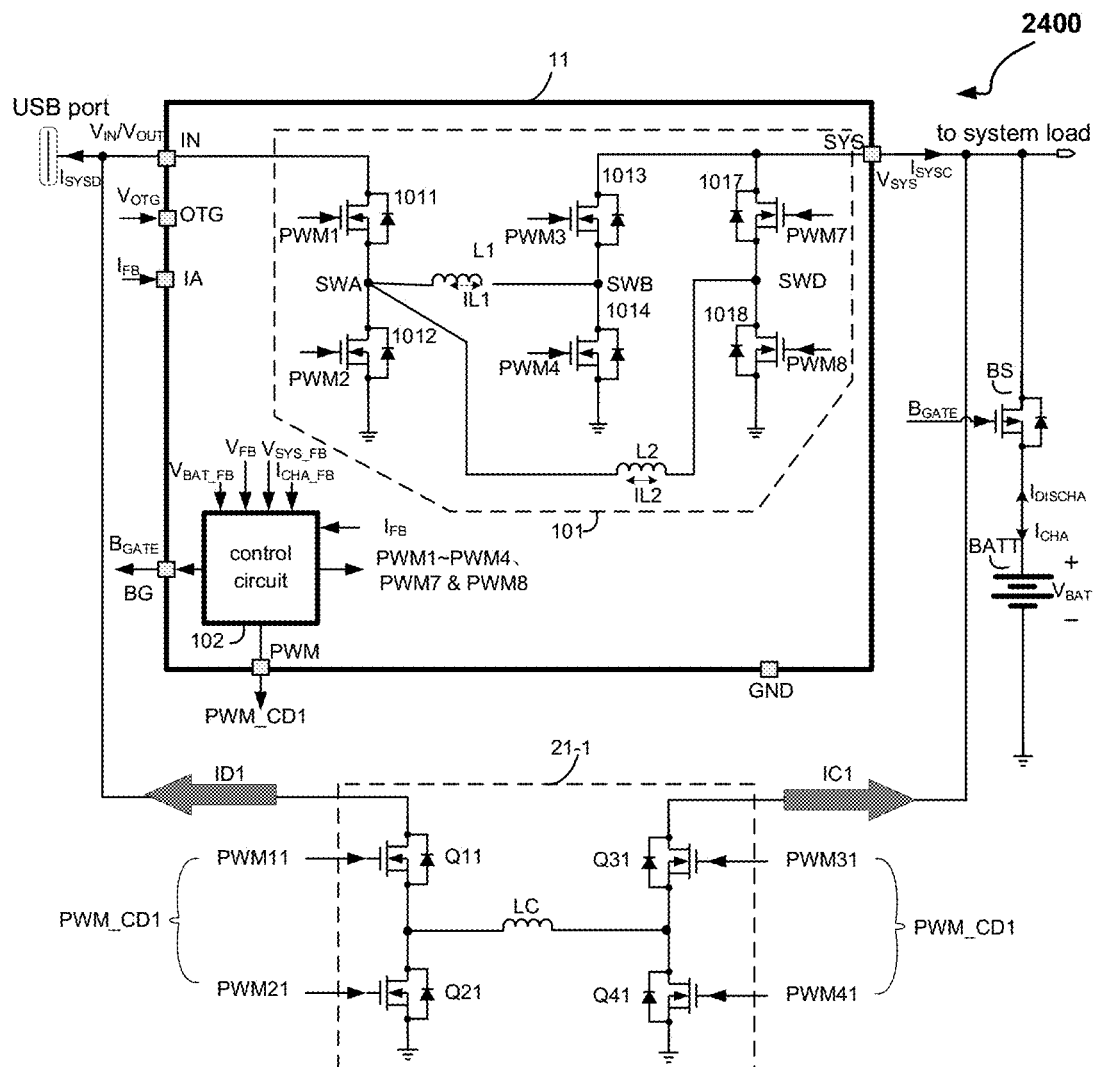
FIG. 24 schematically illustrates a battery current management system 2400 in accordance with an embodiment of the present invention.

FIG. 24 schematically illustrates a battery current management system 2400 in accordance with an embodiment of the present invention. The operations in the regular charge state, the regular discharge state, the fast discharge state of the battery current management system 2400 are the same as these of the battery current management systems 1700, here will not describe in detail again for a purpose of simply. In an embodiment, when the battery current management system 2400 is configured to operate in the fast charge state and the input voltage signal $V_{IN}$ is larger than the system voltage signal $V_{SYS}$, the first switch 1011 and the second switch 1012 are complementary on and off, one or both of the third switch 1013 and the seventh switch 1017 are turned on, the fourth switch 1014 and the third switch 1013 are complementary on and off, the eighth switch 1018 and the seventh switch 1017 are complementary on and off. Meanwhile, the first follower switch Q11 is synchronized or interleaved on and off with the first switch 1011, the second follower switch Q21 is synchronized or interleaved on and off with the second switch 1012, the third follower switch Q31 is on, and the fourth follower switch Q41 is off.

As can be appreciated, the voltage converting circuit 11 of the battery current management systems 2300 and 2400 can also comprise the first inductor pin LX1, the second inductor pin LX2 and the third inductor pin LX3 all of which serve to arrange the inductor L1 and the inductor L2 external of the voltage converting circuit 11 for thermal dissipation. It should also be noted that the voltage converting circuit 11 and switch module 21-1 might comprise any suitable topology as well as these disclosed in this invention disclosure.

Figure 25:
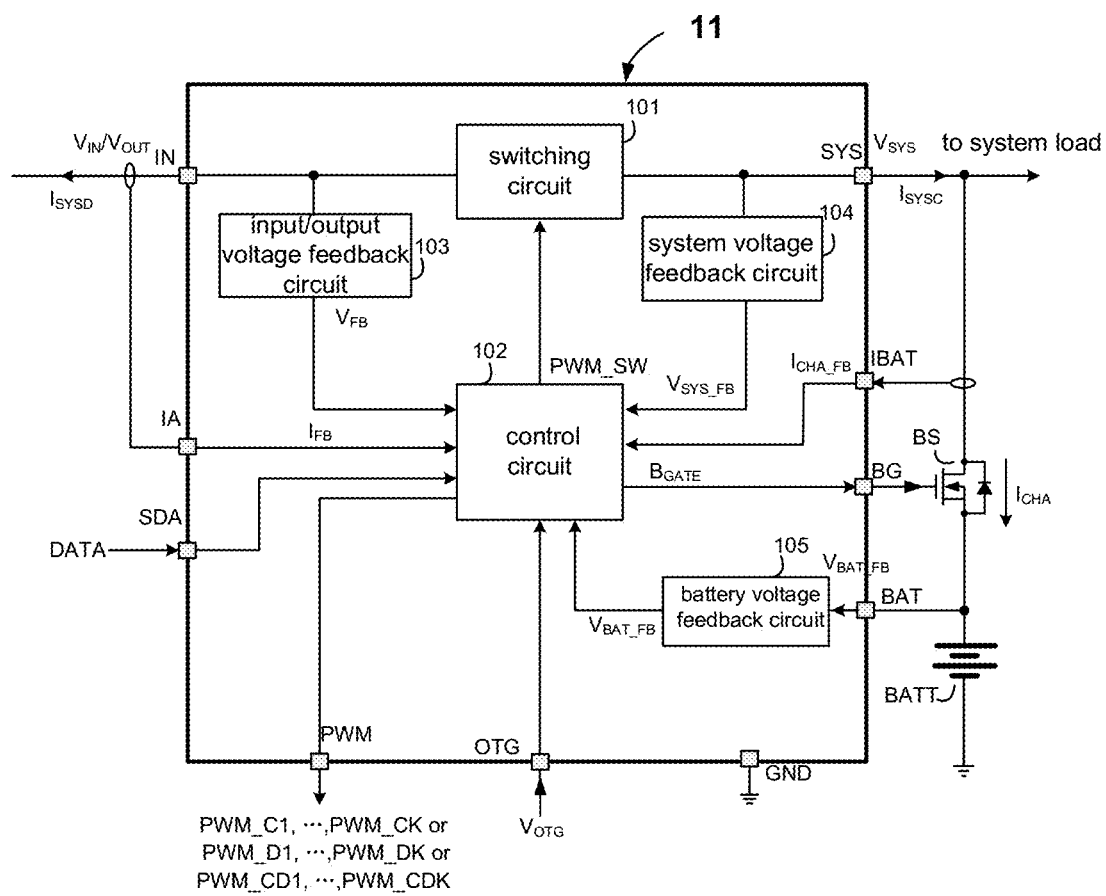
FIG. 25 illustrates a block diagram of the voltage converting circuit 11 in accordance with an embodiment of the present invention.

FIG. 25 illustrates a block diagram of the voltage converting circuit 11 in accordance with an embodiment of the present invention. In the exemplary embodiment of FIG. 25, the voltage converting circuit 11 may comprise the switching circuit 101, the control circuit 102, and a plurality of feedback circuits, for example, an input/output voltage feedback circuit 103, a system voltage feedback circuit 104, and a battery voltage feedback circuit 105. It should be known to those of ordinary skill in the art that the plurality of feedback circuits are not limited to those illustrated in the embodiment shown in FIG. 25, other feedback circuits may also be included in the voltage converting circuit 11, such as a temperature feedback circuit. The input/output voltage feedback circuit 103 may be configured to sense the voltage at the port connecting pin IN to generate the voltage feedback signal $V_{FB}$. The system voltage feedback circuit 104 may be configured to sense the system voltage signal $V_{SYS}$ to generate the system voltage feedback signal $V_{SYS\_FB}$. The battery voltage feedback circuit 105 may be configured to sense the voltage across the battery pack BATT to generate the battery voltage feedback signal $V_{BAT\_FB}$.

The control circuit 102 may be configured to receive the voltage feedback signal $V_{FB}$, the system voltage feedback signal $V_{SYS\_FB}$, the battery voltage feedback signal $V_{BAT\_FB}$, the battery current feedback signal $I_{CHA\_FB}$ from the battery current pin IBAT, the current feedback signal $I_{FB}$ from the current sense pin IA, and a data signal DATA from the data pin SDA, and further configured to generate a group of control signals PWM_SW (e.g., the control signals PWM1-PWM8), the driving signal $B_{GATE}$, and a plurality of switch module control signals (e.g., the plurality of switch module charge control signals, the plurality of switch module discharge control signals or the plurality of switch module charge and discharge control signals) at the control pin PWM.

Figure 26:
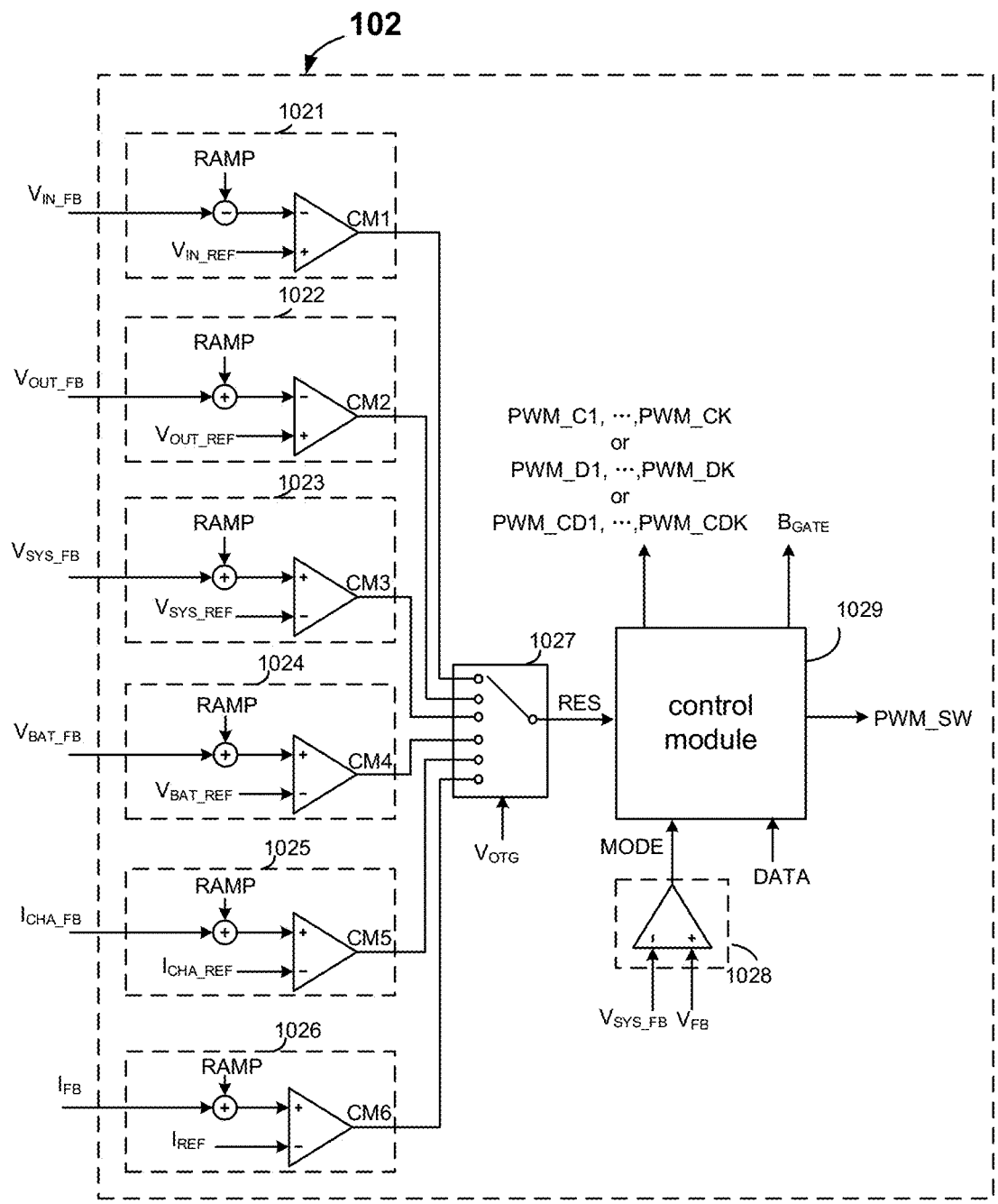
FIG. 26 schematically illustrates a block diagram of the control circuit 102 shown in FIG. 25 in accordance with an embodiment of the present invention.

FIG. 26 schematically illustrates a block diagram of the control circuit 102 shown in FIG. 25 in accordance with an embodiment of the present invention. In the exemplary embodiment of FIG. 26, the control circuit 102 may comprise a plurality of feedback control loops 1021-1026, a data selector 1027, a comparing circuit 1028 and a control module 1029.

Each of the feedback control loops 1021-1026 may be configured to receive a feedback signal, a ramp signal RAMP and a reference signal, and may further configured to provide a corresponding loop control signal (CM1, CM2, CM3, CM4, CM5 or CM6). In an embodiment, each of the feedback control loops 1021-1026 may comprise an operating circuit and a comparing circuit, wherein the operating circuit may be configured to provide an operating signal based on the feedback signal and the ramp signal RAMP, and the comparing circuit may be configured to provide the loop control signal through comparing the operating signal with the reference signal.

The data selector 1027 may be configured to receive the OTG signal $V_{OTG}$ and the loop control signals CM1-CM6, and further configured to select one or more appropriate loop control signals from the loop control signals CM1-CM6 according to the OTG signal $V_{OTG}$ to provide a logic signal RES. In an embodiment, the logic signal RES may vary in response to change in any of the loop control signals CM1-CM6, e.g., the logic signal RES may become high voltage level when any of the loop control signals CM1~CM6 becomes high voltage level.

The comparing circuit 1028 has a non-inverting input terminal configured to receive the voltage feedback signal $V_{FB}$ (i.e., the input voltage feedback signal $V_{IN\_FB}$ when the voltage converting circuit 11 is in the charge mode, or the output voltage feedback signal $V_{OUT\_FB}$ when the voltage converting circuit 11 is in the discharge mode), an inverting input terminal configured to receive the system voltage feedback signal $V_{SYS\_FB}$, and an output terminal. The comparing circuit 1028 is configured to provide a mode control signal MODE at the output terminal through comparing the voltage feedback signal $V_{FB}$ with the system voltage feedback signal $V_{SYS\_FB}$. When the voltage feedback signal $V_{FB}$ is higher than the system voltage feedback signal $V_{SYS\_FB}$, the mode control signal MODE becomes high voltage level such that the control module 1029 is configured to control the switching circuit 101 to work in the step-down mode. When the voltage feedback signal $V_{FB}$ is lower than the system voltage feedback signal $V_{SYS\_FB}$, the mode control signal MODE becomes low voltage level such that the control module 1029 is configured to control the switching circuit 101 to work in the step-up mode. The control module 1029 is configured to receive the logic signal RES, the mode control signal MODE and the data signal DATA, and further configured to provide the group of control signals PWM_SW, the driving signal $B_{GATE}$ and the plurality of switch module control signals.

Figure 27:
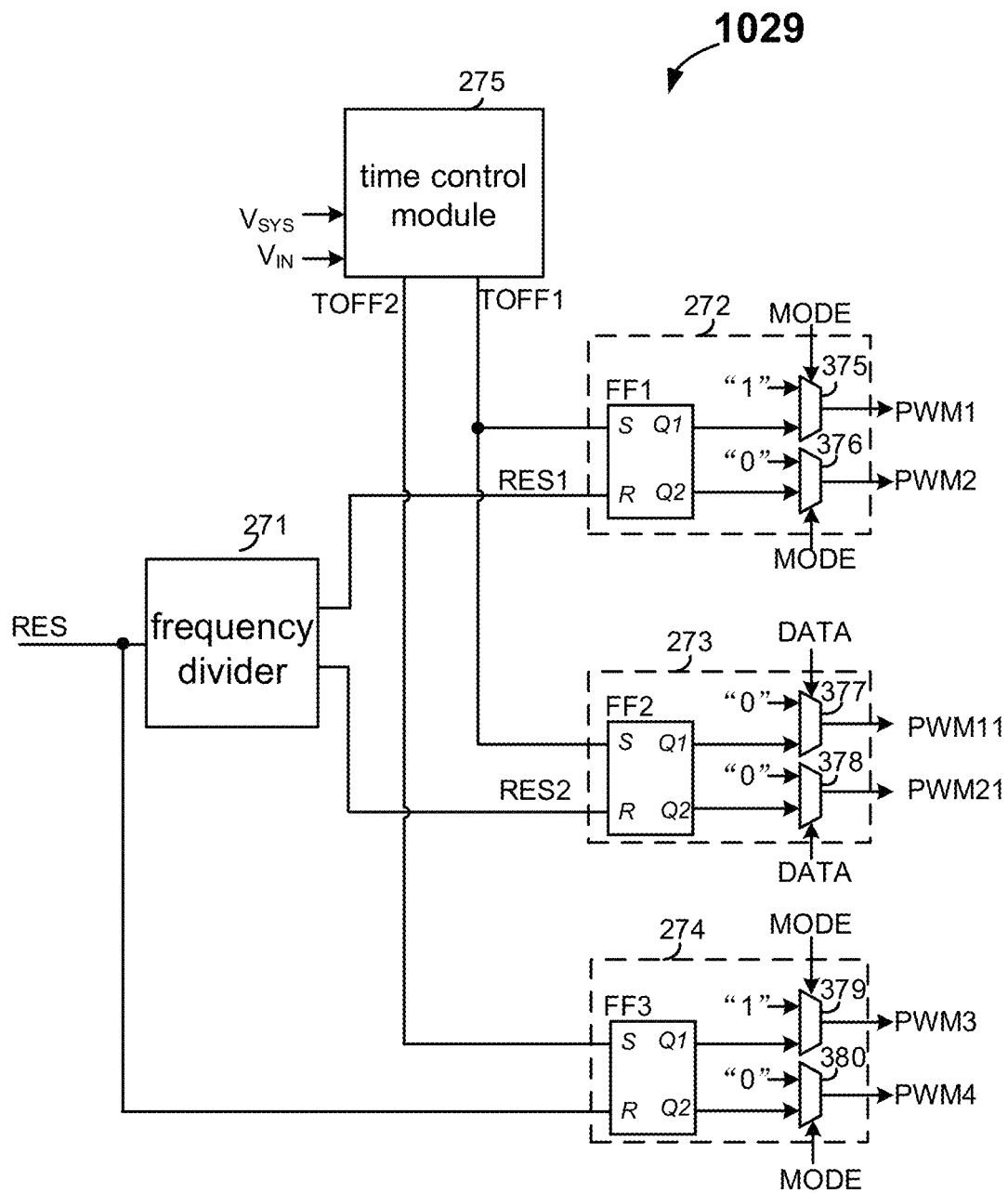
FIG. 27 schematically illustrates a block diagram of the control module 1029 shown in FIG. 26 in accordance with an embodiment of the present invention.

FIG. 27 schematically illustrates a block diagram of the control module 1029 shown in FIG. 26 in accordance with an embodiment of the present invention. In the exemplary embodiment of FIG. 27, the control module 1029 may comprise a frequency divider 271, a first logic circuit 272, a second logic circuit 273, a third logic circuit 274 and a time control module 275.

The frequency divider 271 may be configured to receive the logic signal RES, and further configured to perform frequency division on the logic signal RES to generate a first frequency division signal RES1 and a second frequency division signal RES2. One of ordinary skill can be understood, the frequency divider 271 may have a variety of implementations will not described herein for the sake of simplicity.

In the embodiment shown in FIG. 27, the time control module 275 may be configured to generate a first time control signal TOFF1 and a second time control signal TOFF2. In one embodiment, the time control module 275 may be configured to generate the first time control signal TOFF1 and the second time control signal TOFF2 based on commands provided by a program. In another embodiment, the time control module 275 may be configured to generate the first time control signal TOFF1 according to a desired switching cycle of the first switch 1011, and generate the second time control signal TOFF2 according to a desired switching cycle of the third switch 1013. In one embodiment, the first and the second time control signals TOFF1 and TOFF2 can be adjusted dynamically with the change of parameters (e.g., the input voltage signal $V_{IN}$ and the system voltage signal $V_{SYS}$) when the voltage converting circuit 11 is operated.

The first logic circuit 272 may be configured to receive the first frequency division signal RES1, the mode control signal MODE and the first time control signal TOFF1, and further configured to generate the control signal PWM1 and the control signal PWM2. In an embodiment, when the mode control signal MODE is in the high state, the first logic circuit 272 may be configured to generate the control signal PWM1 and the control signal PWM2 according to the first frequency division signal RES1 and the first time control signal TOFF1. When the mode control signal MODE is in the low state, the first logic circuit 272 may be configured to maintain the control signal PWM1 in the high state to keep the first switch 1011 on, and maintain the control signal PWM2 in the low state to keep the second switch 1012 off.

In an embodiment, the first logic circuit 272 may comprise a RS flip-flop FF1, a selecting circuit 375 and a selecting circuit 376. The RS flip-flop FF1 may comprise a set terminal S configured to receive the first time control signal TOFF1, a reset terminal R configured to receive the first frequency division signal RES1, a first output terminal Q1 and a second output terminal Q2. The selecting circuit 375 may comprise a first input terminal receiving a logic high signal "1", a second input terminal coupled to the first output terminal Q1 of the RS flip-flop FF1, a control terminal receiving the mode control signal MODE. In an embodiment, when the mode control signal MODE is logic high, the selecting circuit 375 is configured to select a signal generated at the first output terminal Q1 of the RS flip-flop FF1 as the control signal PWM1; when the mode control signal MODE is logic low, the selecting circuit 375 is configured to select the logic high signal "1" as the control signal PWM1. The selecting circuit 376 may comprise a first input terminal receiving a logic low signal "0", a second input terminal coupled to the second output terminal Q2 of the RS flip-flop FF1, a control terminal receiving the mode control signal MODE. In an embodiment, when the mode control signal MODE is logic high, the selecting circuit 375 is configured to select a signal generated at the second output terminal Q2 of the RS flip-flop FF1 as the control signal PWM2; when the mode control signal MODE is logic low, the selecting circuit 375 is configured to select the logic low signal "0" as the control signal PWM2.

The second logic circuit 273 may be configured to receive the second frequency division signal RES2, the data signal DATA, and the first time control signal TOFF1, and further configured to generate the first follower switch control signal PWM11 and the second follower switch control signal PWM21. In an embodiment, when the data signal DATA is in the high state, the second logic circuit 273 may be configured to generate the first follower switch control signal PWM11 and the second follower switch control signal PWM21 according to the second frequency division signal RES2 and the first time control signal TOFF1. When the data signal DATA is in the low state, the second logic circuit 273 may be configured to maintain the first follower switch control signal PWM11 in the low state to keep the first follower switch Q11 off, and maintain the second follower switch control signal PWM21 in the low state to keep the second follower switch Q21 off.

In an embodiment, the second logic circuit 273 may comprise a RS flip-flop FF2, a selecting circuit 377 and a selecting circuit 378. The RS flip-flop FF2 may comprise a set terminal S configured to receive the first time control signal TOFF1, a reset terminal R configured to receive the second frequency division signal RES2, a first output terminal Q1 and a second output terminal Q2. The selecting circuit 377 may comprise a first input terminal receiving a logic low signal "0", a second input terminal coupled to the first output terminal Q1 of the RS flip-flop FF2, a control terminal receiving the data signal DATA. In an embodiment, when the data signal DATA is logic high, the selecting circuit 377 is configured to select a signal generated at the first output terminal Q1 of the RS flip-flop FF2 as the control signal PWM1; when the data signal DATA is logic low, the selecting circuit 377 is configured to select the logic low signal "0" as the first follower switch control signal PWM11. The selecting circuit 378 may comprise a first input terminal receiving a logic low signal "0", a second input terminal coupled to the second output terminal Q2 of the RS flip-flop FF2, a control terminal receiving the data signal DATA. In an embodiment, when the data signal DATA is logic high, the selecting circuit 378 is configured to select a signal generated at the second output terminal Q2 of the RS flip-flop FF2 as the second follower switch control signal PWM21; when the data signal DATA is logic low, the selecting circuit 378 is configured to select the logic low signal "0" as the second follower switch control signal PWM21.

The third logic circuit 274 may be configured to receive the logic signal RES, the mode control signal MODE and the second time control signal TOFF2, and further configured to generate the control signal PWM3 and the control signal PWM4. In an embodiment, when the mode control signal MODE is in the low state, the third logic circuit 274 may be configured to generate the control signal PWM3 and the control signal PWM4 according to the control signal RES and the second time control signal TOFF2. When the mode control signal MODE is in the high state, the third logic circuit 274 may be configured to maintain the control signal PWM3 in the high state to keep the third switch 1013 on, and maintain the control signal PWM4 in the low state to keep the fourth switch 1014 off.

In an embodiment, the third logic circuit 274 may comprise a RS flip-flop FF3, a selecting circuit 379 and a selecting circuit 380. The RS flip-flop FF1 may comprise a set terminal S configured to receive the first time control signal TOFF1, a reset terminal R configured to receive the first frequency division signal RES1, a first output terminal Q1 and a second output terminal Q2. The selecting circuit 379 may comprise a first input terminal receiving a logic high signal "1", a second input terminal coupled to the first output terminal Q1 of the RS flip-flop FF3, a control terminal receiving the mode control signal MODE. In an embodiment, when the mode control signal MODE is logic low, the selecting circuit 379 is configured to select a signal generated at the first output terminal Q1 of the RS flip-flop FF3 as the control signal PWM3; when the mode control signal MODE is logic high, the selecting circuit 379 is configured to select the logic high signal "1" as the control signal PWM3. The selecting circuit 380 may comprise a first input terminal receiving a logic low signal "0", a second input terminal coupled to the second output terminal Q2 of the RS flip-flop FF3, a control terminal receiving the mode control signal MODE. In an embodiment, when the mode control signal MODE is logic low, the selecting circuit 380 is configured to select a signal generated at the second output terminal Q2 of the RS flip-flop FF3 as the control signal PWM4; when the mode control signal MODE is logic high, the selecting circuit 380 is configured to select the logic low signal "0" as the control signal PWM4.

Obviously many modifications and variations of the present invention are possible in light of the above teachings. It is therefore to be understood that within the scope of the appended claims the invention may be practiced otherwise than as specifically described. It should be understood, of course, the foregoing invention relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

We claim:

1. A battery discharge current management system, comprising:
   a voltage converting circuit, having a first pin, a second pin, and a third pin; and
   a first switch module, having a first terminal coupled to the first pin, a second terminal coupled to the second pin, and a control terminal coupled to the third pin; and wherein
   when the battery discharge current management system is configured to operate in a discharge state, the voltage converting circuit is configured to convert a system voltage signal at the second pin to an output voltage signal at the first pin, and further configured to generate a master discharge current signal at the first pin, and further configured to control the first switch module to generate a first additional discharge current signal at the first terminal of the first switch module; and
   wherein the voltage converting circuit comprises:
   a first switch;
   a second switch, wherein the first switch and the second switch are coupled in series between the first pin and a logic ground;
   a third switch;
   a fourth switch, wherein the third switch and the fourth switch are coupled in series between the second pin and the logic ground; and
   a first inductor, coupled between a common connection of the first switch and the second switch and a common connection of the third switch and the fourth switch.

2. The battery discharge current management system of claim 1, further comprising a second switch module, wherein a first terminal of the second switch module is coupled to the first pin, a second terminal of the second switch module is coupled to the second pin, and a control terminal of the second switch module is coupled to the third pin, and wherein the voltage converting circuit is configured to control the second switch module to generate a second additional discharge current signal at the first terminal of the second switch module.

3. The battery discharge current management system of claim 2, wherein the first additional discharge current signal and the second additional discharge current signal respectively have an average value in each one switching period of the battery discharge current management system, and wherein the average value of the first additional discharge current signal is equal to the average value of the second additional current signal.

4. The battery discharge current management system of claim 1, wherein the first switch module comprises:
   a third follower switch;
   a fourth follower switch, wherein the third follower switch and the fourth follower switch are coupled in series between the second terminal of the first switch module and the logic ground; and
   a follower inductor, coupled between the first terminal of the first switch module and a common connection of the third follower switch and the fourth follower switch.

5. The battery discharge current management system of claim 4, wherein when the system voltage signal is larger than the output voltage signal, the third follower switch is configured to turn on and off synchronously with the third switch, and the fourth follower switch is configured to turn on and off synchronously with the fourth switch.

6. The battery discharge current management system of claim 4, wherein when the system voltage signal is larger than the output voltage signal, the third follower switch and the third switch are interleaved to turn on and off, and the fourth follower switch and the fourth switch are interleaved to turn on and off.

7. The battery discharge current management system of claim 4, wherein
   the first switch module further comprises:
   a first follower switch; and
   a second follower switch, wherein the first follower switch and the second follower switch are coupled in series between the first terminal of the first switch module and the logic ground; and wherein
   the follower inductor is no longer coupled between the first terminal of the first switch module and the common connection of the third follower switch and the fourth follower switch, but coupled between a common connection of the first follower switch and the second follower switch and the common connection of the third follower switch and the fourth follower switch.

8. The battery discharge current management system of claim 7, wherein the first follower switch is configured to turn on and off synchronously with the first switch, the second follower switch is configured to turn on and off synchronously with the second switch, the third follower switch is configured to turn on and off synchronously with the third switch, the fourth follower switch is configured to turn on and off synchronously with the fourth switch.

9. The battery discharge current management system of claim 7, wherein
when the system voltage signal is larger than the output voltage signal, the first follower switch and the first switch are turned on, the second follower switch and the second switch are turned off, the third follower switch and the third switch are interleaved to turn on and off, and the fourth follower switch and the fourth switch are interleaved to turn on and off; and wherein
when the system voltage signal is smaller than the output voltage signal, the first follower switch and the first switch are interleaved to turn on and off, the second follower switch and the second switch are interleaved to turn on and off, the third follower switch and the third switch are turned on, and the fourth follower switch and the fourth switch are turned off.

10. The battery discharge current management system of claim 7, wherein
when the battery discharge current management system is configured to operate in a charge state, the voltage converting circuit is configured to receive an input voltage signal at the first pin, and further configured to convert the input voltage signal to the system voltage signal at the second pin, and further configured to generate a master charge current signal at the second pin, and further configured to control the first switch module to generate a first additional charge current signal at the second terminal of the first switch module; and wherein
the first follower switch is configured to turn on and off synchronously with the first switch, the second follower switch is configured to turn on and off synchronously with the second switch, the third follower switch is configured to turn on and off synchronously with the third switch, and the fourth follower switch is configured to turn on and off synchronously with the fourth switch.

11. The battery discharge current management system of claim 7, wherein
when the battery discharge current management system is configured to operate in a charge state, the voltage converting circuit is configured to receive an input voltage signal at the first pin, and further configured to convert the input voltage signal to the system voltage signal at the second pin, and further configured to generate a master charge current signal at the second pin, and further configured to control the first switch module to generate a first additional charge current signal at the second terminal of the first switch module; and wherein
when the input voltage signal is larger than the system voltage signal, the first follower switch and the first switch are interleaved to turn on and off, the second follower switch and the second switch are interleaved to turn on and off, the third follower switch and the third switch are turned on, and the fourth follower switch and the fourth switch are turned off; and wherein
when the input voltage signal is smaller than the system voltage signal, the first follower switch and the first switch are turned on, the second follower switch and the second switch are turned off, the third follower switch and the third switch are interleaved to turn on and off, and the fourth follower switch and the fourth switch are interleaved to turn on and off.

12. The battery discharge current management system of claim 4, wherein
the voltage converting circuit further comprises:
a fifth switch;
a sixth switch, wherein the fifth switch and the sixth switch are coupled in series between the second pin and the logic ground; and
a second inductor, coupled between a common connection of the fifth switch and the sixth switch, and the common connection of the first switch and the second switch.

13. The battery discharge current management system of claim 12, wherein when the system voltage signal is larger than the output voltage signal, the third switch, the fifth switch and the third follower switch are configured to turn on and off synchronously; the fourth switch, the sixth switch and the fourth follower switch are configured to turn on and off synchronously.

14. The battery discharge current management system of claim 12, wherein when the system voltage signal is larger than the output voltage signal, the third switch, the fifth switch and the third follower switch are successively interleaved on and off; the fourth switch, the sixth switch and the fourth follower switch are interleaved on and off.

15. The battery discharge current management system of claim 12, wherein
the first switch module further comprises:
a first follower switch; and
a second follower switch, wherein the first follower switch and the second follower switch are coupled in series between the first terminal of the first switch module and the logic ground; and wherein
the follower inductor is no longer coupled between the first terminal of the first switch module and the common connection of the third follower switch and the fourth follower switch, but coupled between a common connection of the first follower switch and the second follower switch and the common connection of the third follower switch and the fourth follower switch; and wherein
when the system voltage signal is larger than the output voltage signal, the third switch, the fifth switch and the third follower switch are successively interleaved on and off; the fourth switch, the sixth switch and the fourth follower switch are interleaved on and off; the first follower switch and the first switch are turned on, and the second follower switch and the second switch are turned off; and wherein
when the system voltage signal is smaller than the output voltage signal, the third switch, the fifth switch and the third follower switch are turned on; the fourth switch, the sixth switch and the fourth follower switch are turned off; the first follower switch and the first switch are successively interleaved on and off, and the second follower switch and the second switch are successively interleaved on and off.

16. The battery discharge current management system of claim 15, wherein when the system voltage signal is smaller than the output voltage signal, not both but one of the third switch and the fifth switch are turned on, and wherein the fourth switch and the third switch are complementary on and off, and the sixth switch and the fifth switch are complementary on and off.

17. The battery discharge current management system of claim 12, wherein the voltage converting circuit further comprises a fifth pin, a sixth pin and a seventh pin, and wherein the first inductor is coupled between the fifth pin and the sixth pin, and wherein the second inductor is coupled between the fifth pin and the seventh pin, and wherein the first terminal of first switch module is coupled to the fifth pin rather than the first pin.

18. The battery discharge current management system of claim 17, wherein the second inductor is omitted, and wherein the sixth pin and the seventh pin are coupled together.

19. The battery discharge current management system of claim 1, wherein the master discharge current signal has an average value in each one switching period of the battery discharge current management system, and wherein the first additional discharge current signal has an average value in each one switching period of the battery discharge current management system, and wherein the average value of the master discharge current signal is integer multiple of the average value of the first additional discharge current signal.

20. The battery discharge current management system of claim 1, wherein the voltage converting circuit is configured to provide a switch module control signal at the third pin, and wherein the first switch module control signal is configured to enable or disable the first switch module, and further configured to control the first switch module to generate the first additional discharge current signal once the first switch module is enabled.

21. The battery discharge current management system of claim 1, further comprising a first extra discharge switch, wherein the second terminal of the first switch module is coupled to the second pin through the first extra discharge switch, and wherein the first extra discharge switch is configured to enable or disable the first switch module.

22. The battery discharge current management system of claim 21, wherein the voltage converting circuit further comprises a fourth pin connected to a microprocessor, and the microprocessor is configured to control the first extra discharge switch on and off.

23. The battery discharge current management system of claim 1, wherein when the battery discharge current management system is configured to operate in a charge state, the voltage converting circuit is configured to receive an input voltage signal at the first pin, and further configured to convert the input voltage signal to the system voltage signal at the second pin, and further configured to generate a master charge current signal at the second pin, and wherein when the battery discharge current management system is configured to operate in the charge state, the first switch module is disabled.

24. The battery discharge current management system of claim 1, wherein when the battery discharge current management system is configured to operate in a charge state, the voltage converting circuit is configured to receive an input voltage signal at the first pin, and further configured to convert the input voltage signal to the system voltage signal at the second pin, and further configured to generate a master charge current signal at the second pin, and further configured to control the first switch module to generate a first additional charge current signal at the second terminal of the first switch module.

25. The battery discharge current management system of claim 1, wherein the first pin is coupled to a USB port, and the second pin is coupled to a battery pack; and wherein when the battery discharge current management system is configured to operate in the discharge state, the USB port is connected to an external power sink; and wherein when the battery discharge current management system is configured to operate in a charge state, the USB port is connected to an external power supply.

26. The battery discharge current management system of claim 1, wherein the voltage converting circuit further comprises an eighth pin, and wherein the eighth pin is configured to set the battery discharge current management system to operate in the discharge state or a charge state.

27. A battery discharge current management system, comprising:
a voltage converting circuit, having a first pin coupled to a USB port, and a second pin coupled to a battery pack;
a switch module, having a first terminal coupled to the first pin, a second terminal coupled to the second pin; and wherein
the voltage converting circuit is configured to generate a master discharge current signal at the first pin when an output voltage signal is provided at the first pin, and further configured to control the switch module to generate an additional discharge current signal at the first terminal of the switch module; and
wherein the voltage converting circuit comprises:
a first switch;
a second switch, wherein the first switch and the second switch are coupled in series between the first pin and a logic ground;
a third switch;
a fourth switch, wherein the third switch and the fourth switch are coupled in series between the second pin and the logic ground; and
a first inductor, coupled between a common connection of the first switch and the second switch and a common connection of the third switch and the fourth switch.

28. The battery discharge current management system of claim 27, wherein the voltage converting circuit is configured to generate a master charge current signal at the second pin when an input voltage signal is received at the first pin, and further configured to control the switch module to generate an additional charge current signal at the second terminal of the switch module.

29. A voltage converting integrated circuit, comprising:
a first pin;
a second pin;
a third pin, configured to provide a switch module control signal; wherein when an output voltage signal is provided at the first pin, the voltage converting integrated circuit is configured to generate a master discharge current signal at the first pin, and the switch module control signal is configured to control a switch module to generate an additional discharge current signal at the first pin;
a first switch;
a second switch, wherein the first switch and the second switch are coupled in series between the first pin and a logic ground;
a third switch;
a fourth switch, wherein the third switch and the fourth switch are coupled in series between the second pin and the logic ground; and a first inductor, coupled between a common connection of the first switch and the second switch and a common connection of the third switch and the fourth switch.

\* \* \* \* \*